United States Patent
Karode et al.

(10) Patent No.: US 12,508,549 B2
(45) Date of Patent: Dec. 30, 2025

(54) GAS SEPARATION MEMBRANE BUNDLE WITH CONVERTIBLE FLOW CONFIGURATIONS

(71) Applicants: L'Air Liquide, Societe Anonyme pour l'Etude et l'Exploitation des Procedes Georges Claude, Paris (FR); Air Liquide Advanced Technologies U.S. LLC, Houston, TX (US)

(72) Inventors: Sandeep K. Karode, Boothwyn, PA (US); Karl Beers, Havertown, PA (US); Sudhir S. Kulkarni, Wilmington, DE (US); Tim Poludniak, Newport, DE (US); Fan Z. Worley, Hockessin, DE (US); Ed Sanders, Jr., Newark, DE (US)

(73) Assignees: L'Air Liquide, Societe Anonyme pour l'Etude et l'Exploitation des Procédés Georges Claude, Paris (FR); Air Liquide Advanced Technologies U.S. LLC, Houston, TX (US)

( * ) Notice: Subject to any disclaimer, the term of this patent is extended or adjusted under 35 U.S.C. 154(b) by 557 days.

(21) Appl. No.: 17/889,385

(22) Filed: Aug. 16, 2022

(65) Prior Publication Data

US 2024/0058762 A1 Feb. 22, 2024

Related U.S. Application Data

(63) Continuation-in-part of application No. 17/835,961, filed on Jun. 9, 2022, now abandoned.

(51) Int. Cl.
*B01D 53/22* (2006.01)
*B01D 63/02* (2006.01)
(Continued)

(52) U.S. Cl.
CPC .......... *B01D 63/021* (2013.01); *B01D 53/22* (2013.01); *B01D 63/043* (2013.01);
(Continued)

(58) Field of Classification Search
CPC .... B01D 63/021; B01D 53/22; B01D 63/043; B01D 65/003; B01D 69/08;
(Continued)

(56) References Cited

U.S. PATENT DOCUMENTS 3,422,008 A 1/1969 McLain
3,475,331 A 10/1969 McLain
(Continued)

FOREIGN PATENT DOCUMENTS

JP 2017 177 071 10/2017
RU 26542212 C1 4/2018

OTHER PUBLICATIONS

Scholes, C.A. et al., The economics of helium separation and purification by gas separation membranes, Ind. Eng. Chem. Res. 2017, 56, 5014-5020.
(Continued)

*Primary Examiner* — Anthony R Shumate
(74) *Attorney, Agent, or Firm* — Allen E. White; Christopher J. Cronin

(57) ABSTRACT

A hollow fiber membrane bundle useful for manufacturing a wide variety of hollow fiber membrane modules having different flow configurations includes hollow fiber membranes arranged around a porous support tube, a cured resin tubesheet formed at first end of the bundle, and either a cured resin nub or a cured resin tubesheet formed at a second end of the bundle. The bore(s) of the hollow fiber membranes are open at a face of the tubesheet adjacent the first end of the bundle. The tubesheet has an annular structure that encapsulates the hollow fiber membranes and the porous support
(Continued)

tube at the first end of the bundle but which does not completely block a bore of the porous support tube, wherein the collection tube has a plurality of orifices formed therein at least at positions adjacent the nub.

1 Claim, 28 Drawing Sheets

(51) Int. Cl.
B01D 63/04 (2006.01)
B01D 65/00 (2006.01)
B01D 69/08 (2006.01)

(52) U.S. Cl.
CPC ........... *B01D 65/003* (2013.01); *B01D 69/08* (2013.01); *B01D 2053/224* (2013.01); *B01D 2313/041* (2022.08); *B01D 2313/21* (2013.01); *B01D 2313/54* (2013.01); *B01D 2315/10* (2013.01); *B01D 2315/24* (2022.08)

(58) Field of Classification Search
CPC .......... B01D 2313/041; B01D 2315/24; B01D 2053/224; B01D 2313/21; B01D 2313/54; B01D 2315/10
See application file for complete search history.

(56) References Cited

U.S. PATENT DOCUMENTS

| 4,207,192 | A | | 6/1980 | Coplan et al. | |
|---|---|---|---|---|---|
| 4,210,536 | A | | 7/1980 | Coplan et al. | |
| 4,220,489 | A | | 9/1980 | Coplan et al. | |
| 4,631,128 | A | | 12/1986 | Coplan et al. | |
| 4,715,953 | A | | 12/1987 | Leonard | |
| 4,865,736 | A | | 9/1989 | Coplan | |
| 5,071,552 | A | | 12/1991 | Bikson et al. | |
| 5,137,631 | A | * | 8/1992 | Eckman | B01D 63/043 210/321.89 |
| 5,160,042 | A | | 11/1992 | Bikson et al. | |
| 5,176,725 | A | * | 1/1993 | Puri | B01D 63/04 96/8 |
| 5,202,023 | A | * | 4/1993 | Trimmer | B01D 53/22 210/321.89 |
| 5,207,906 | A | | 5/1993 | Auvil et al. | |
| 5,240,471 | A | | 8/1993 | Barbe et al. | |
| 5,470,469 | A | * | 11/1995 | Eckman | B01D 63/043 210/336 |
| 6,136,073 | A | | 10/2000 | Coan et al. | |
| 6,224,763 | B1 | | 5/2001 | Feng et al. | |
| 8,182,592 | B2 | | 5/2012 | Nakamura et al. | |
| 9,314,735 | B2 | | 4/2016 | Balster et al. | |
| 9,987,596 | B2 | | 6/2018 | Pigarev et al. | |
| 10,036,590 | B2 | | 7/2018 | Ploeger et al. | |
| 2002/0162451 | A1 | | 11/2002 | Bikson et al. | |
| 2007/0107596 | A1 | * | 5/2007 | Wynn | B01D 63/12 96/4 |
| 2008/0011157 | A1 | * | 1/2008 | Wynn | B01D 53/22 95/45 |
| 2014/0243574 | A1 | | 8/2014 | Karode | |
| 2018/0161732 | A1 | | 6/2018 | Coignet et al. | |
| 2018/0169584 | A1 | | 6/2018 | Visser et al. | |
| 2018/0221824 | A1 | | 8/2018 | Visser et al. | |
| 2018/0353898 | A1 | | 12/2018 | Hamad et al. | |
| 2020/0088466 | A1 | | 3/2020 | White et al. | |
| 2020/0316527 | A1 | | 10/2020 | Straub et al. | |

OTHER PUBLICATIONS

International Search Report and Written Opinion for corresponding related PCT/US2022/032750, Sep. 22, 2022.

Alders, et al., "Helium recovery using membrane processes," Chemical Process Engineering AVT.CVT, RWTH Aachen University, Turmstrabe 46, 52064, Aachen, Germany, pp. 1-17.

Scholes, et al., Helium separation through polymeric membranes: selectivity targets, Journal of Membrane Science 520 (2016), pp. 221-230.

Scholes, et al., "Review of Membranes for Helium Separation and Purification," www.mdpi.com/journal/membranes, Membranes 2017, 7, 9, doi:10.3390/membranes7010009, pp. 1-13.

* cited by examiner

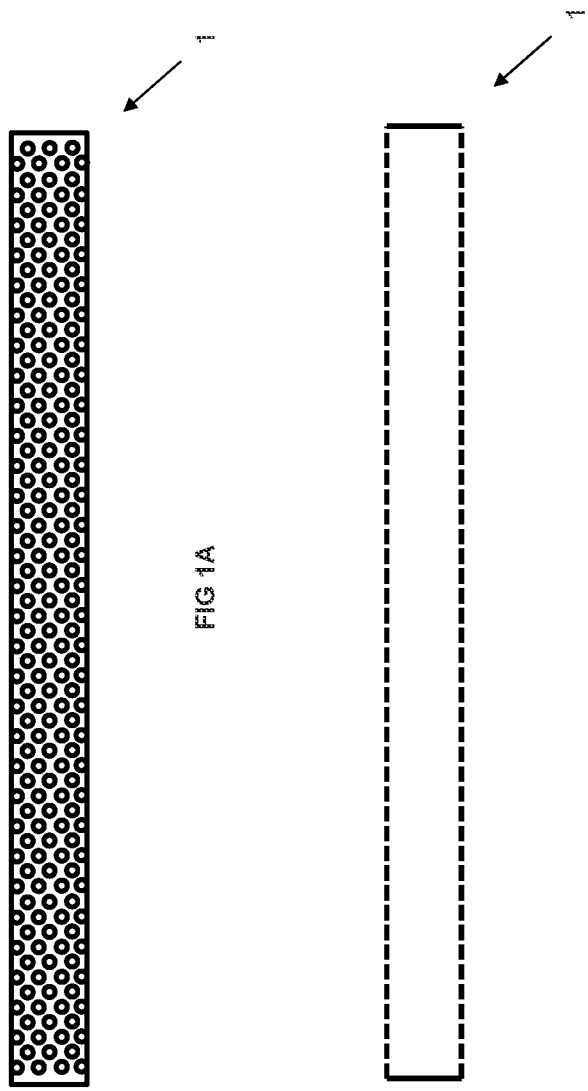

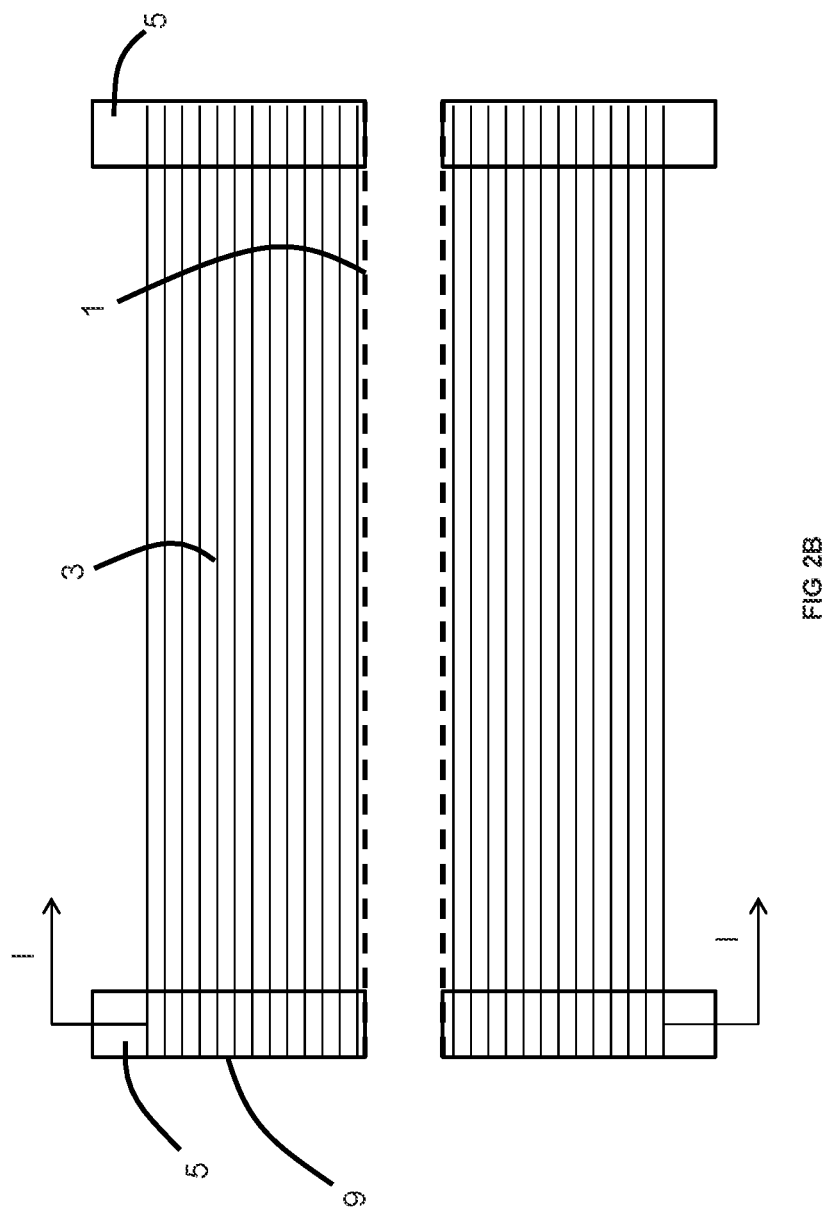

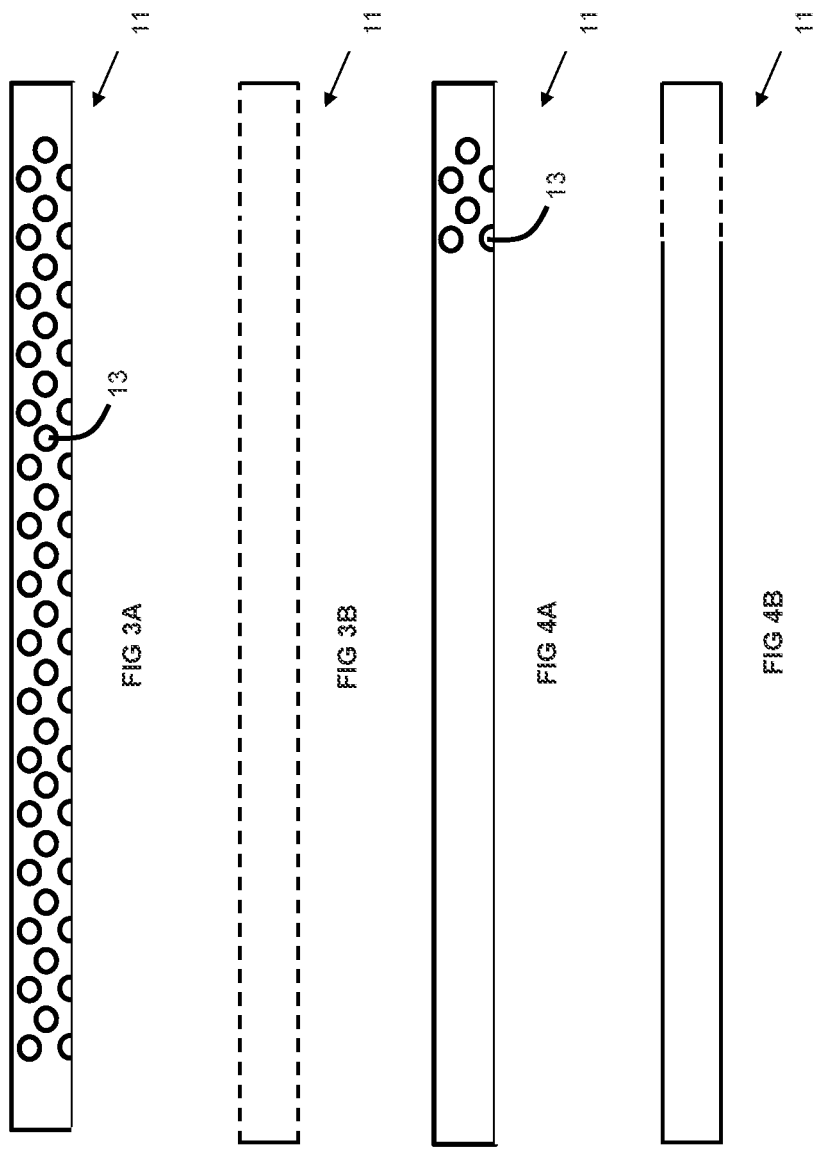

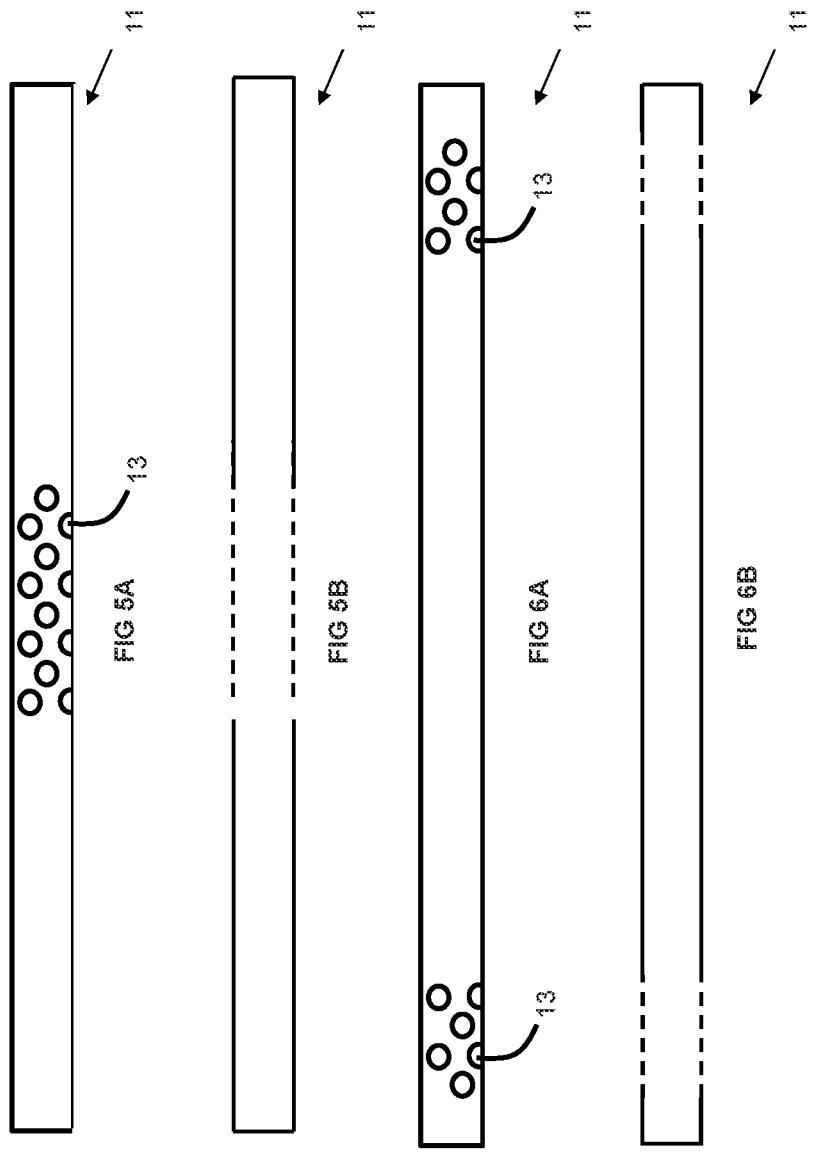

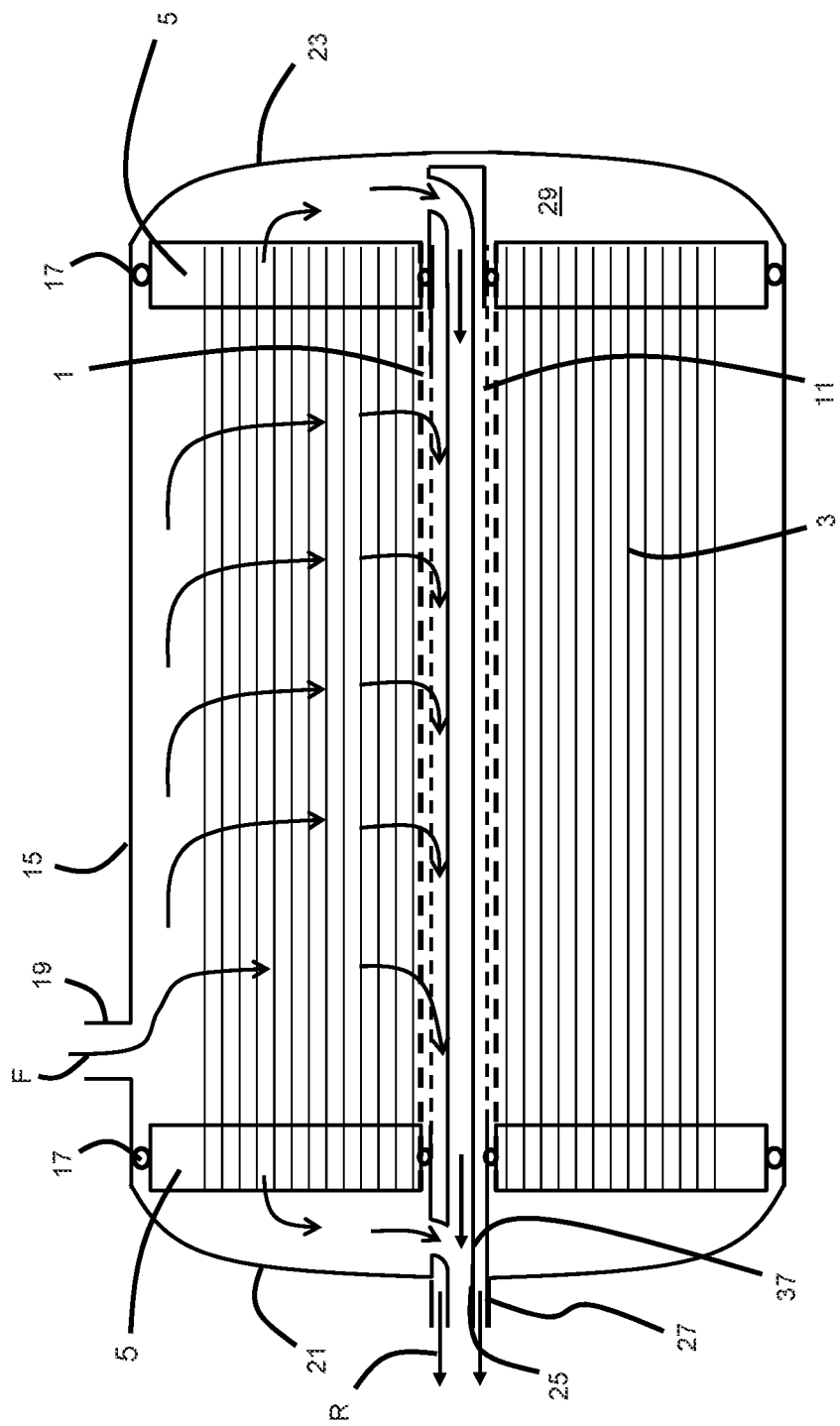

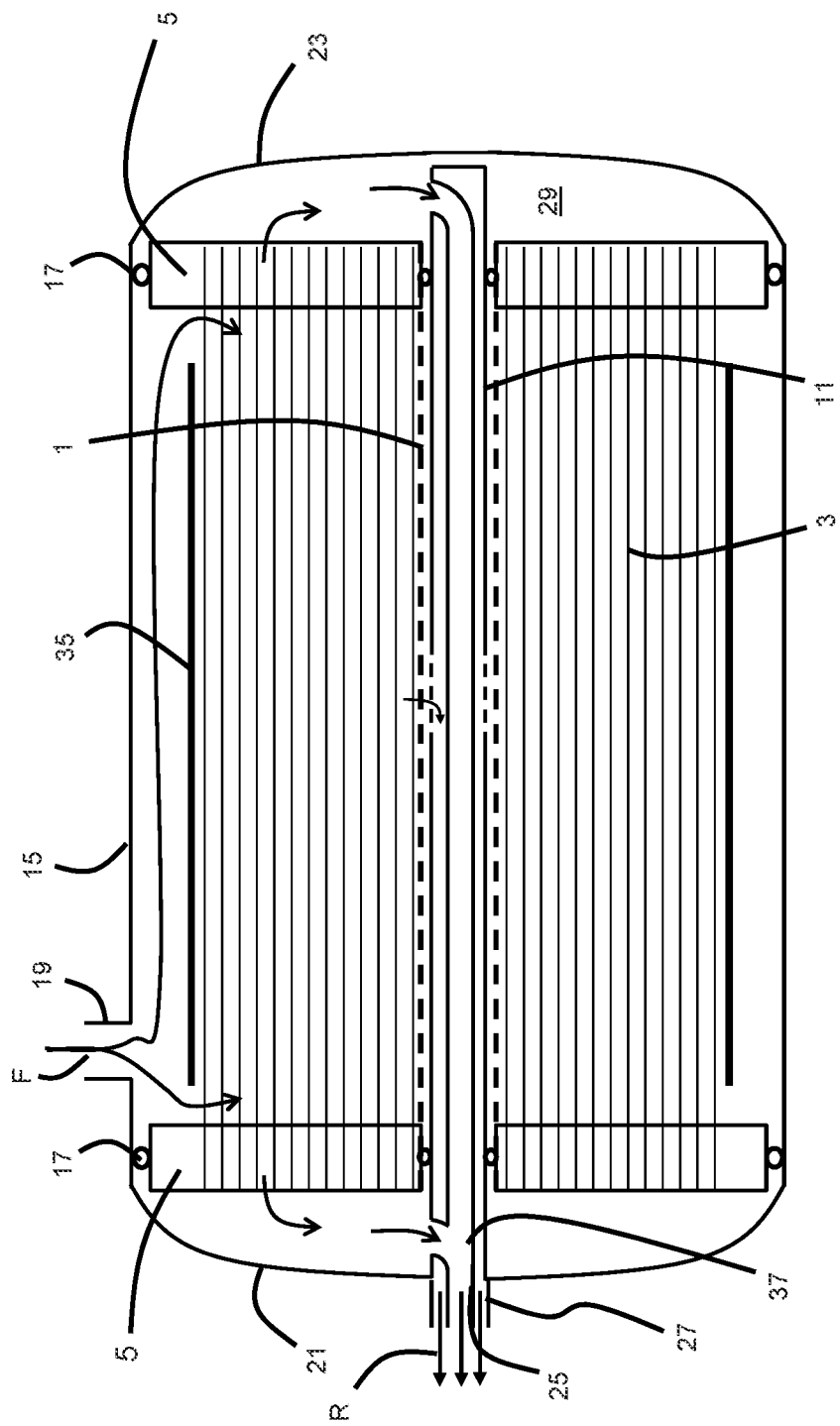

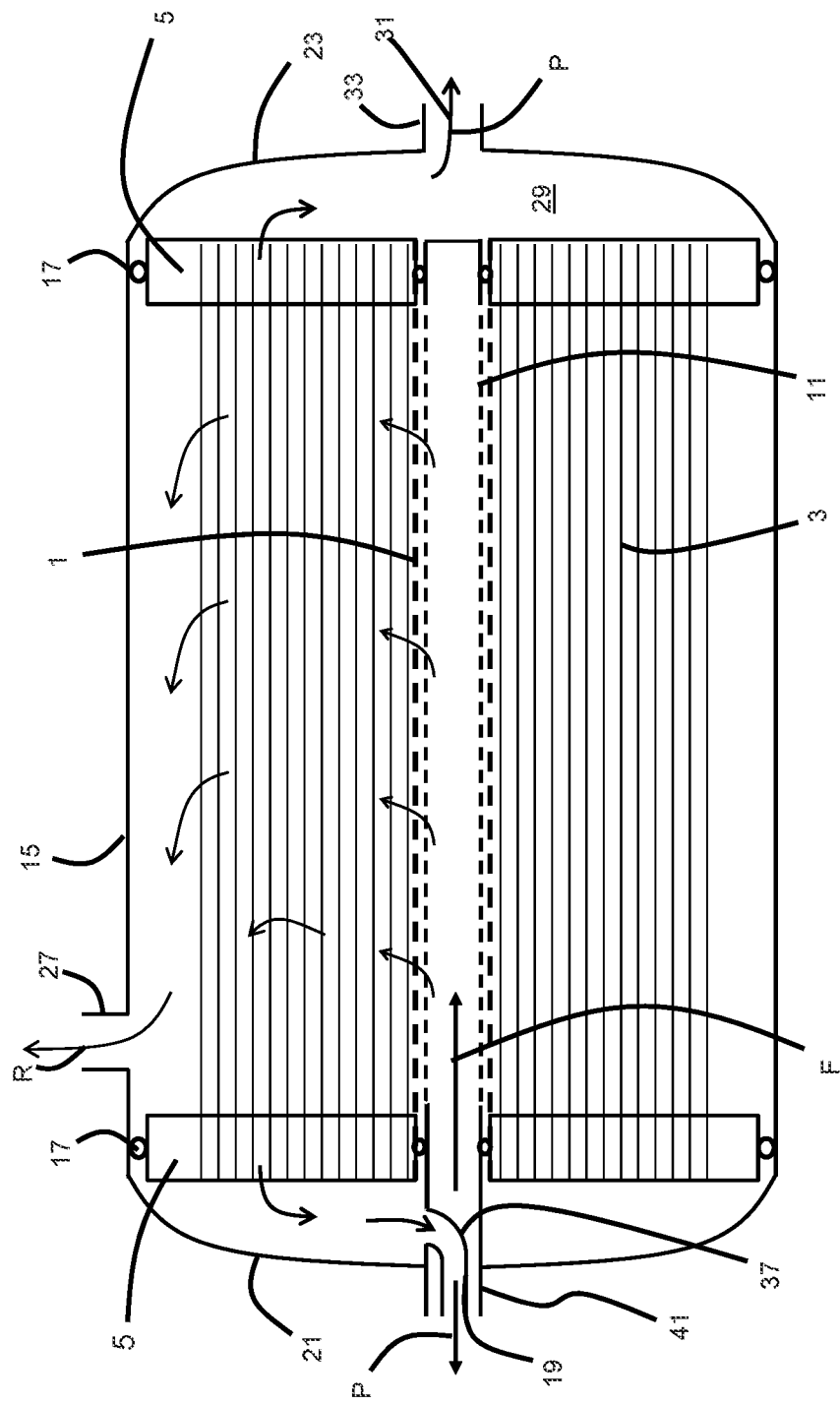

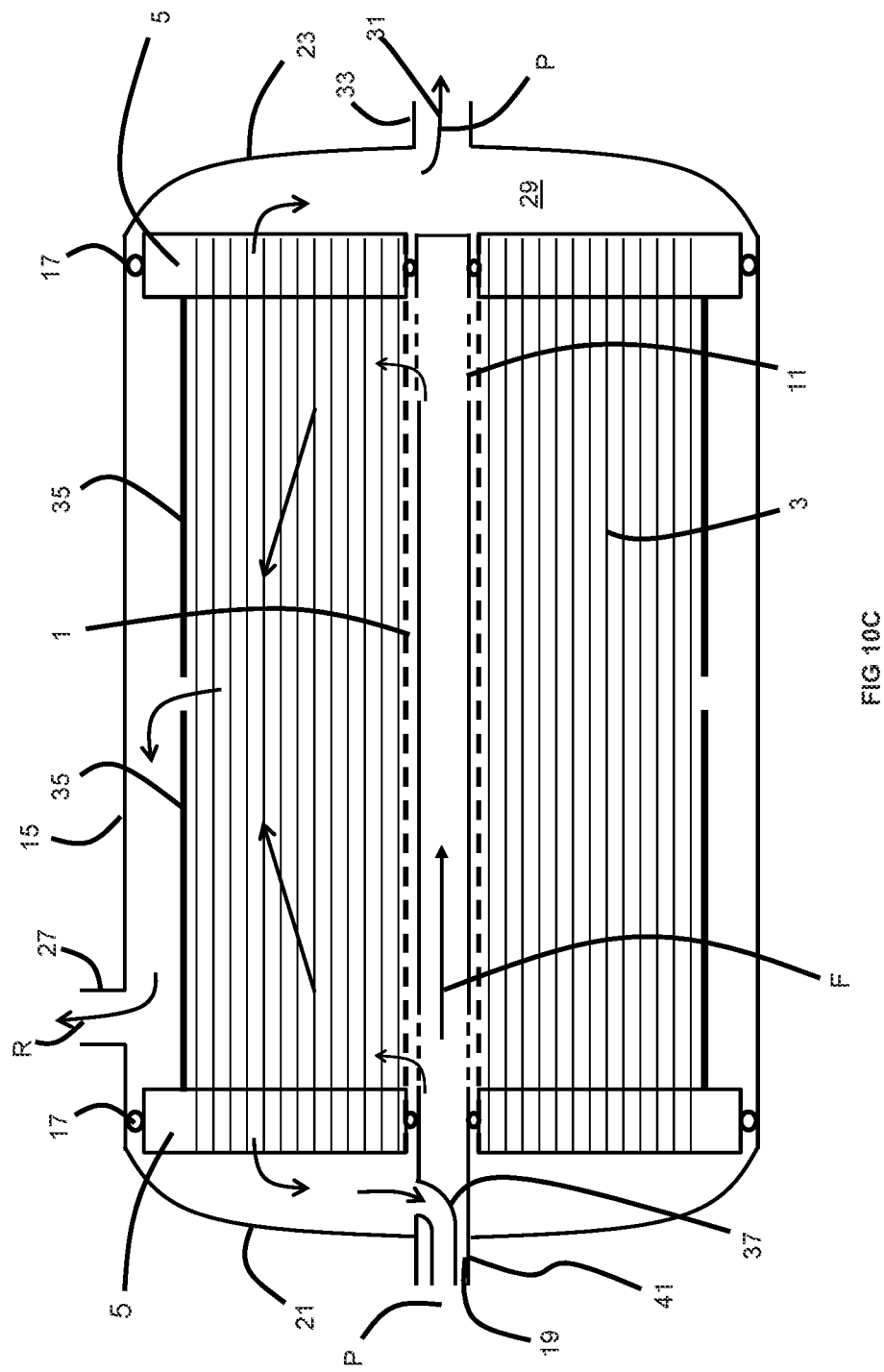

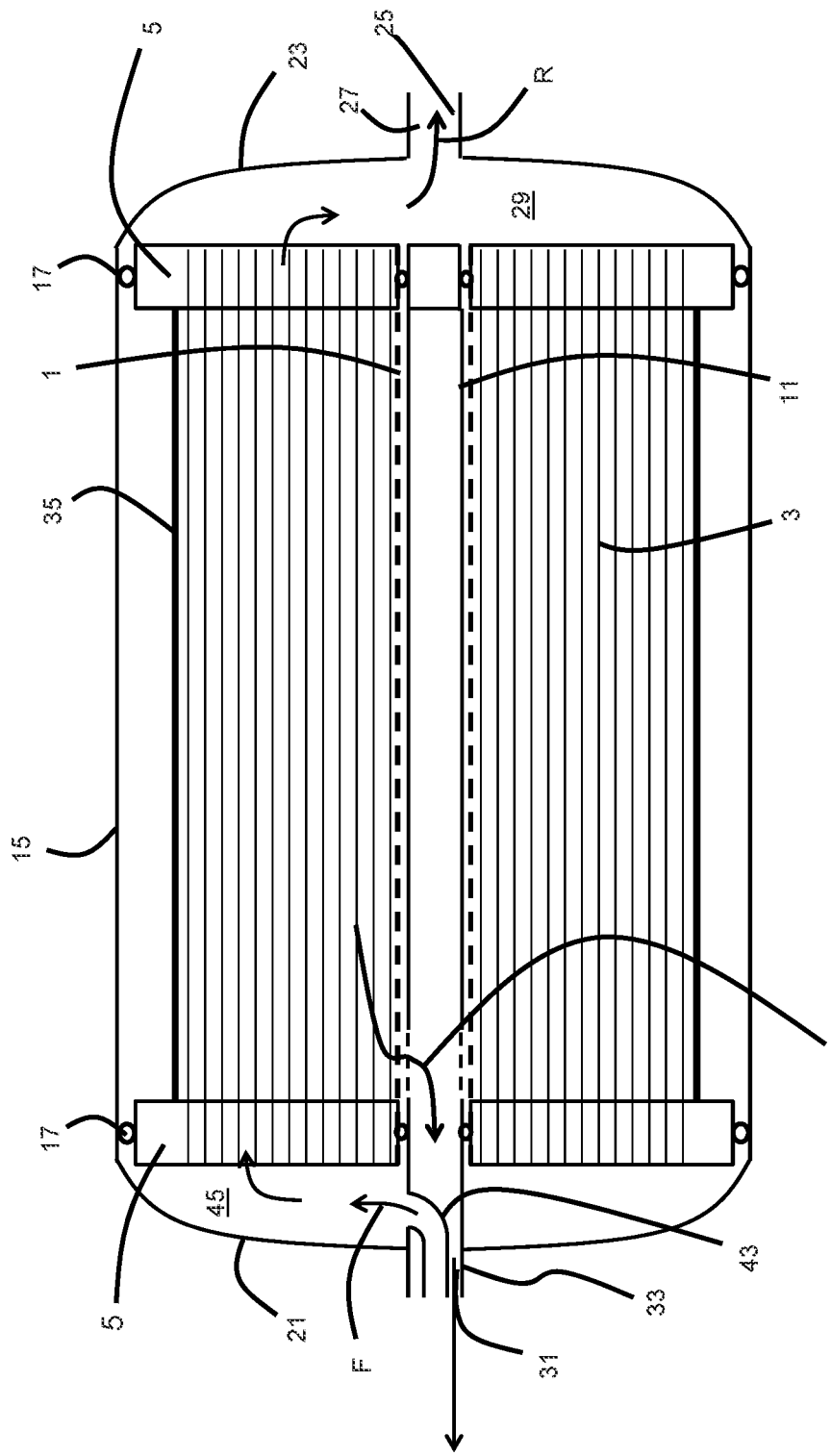

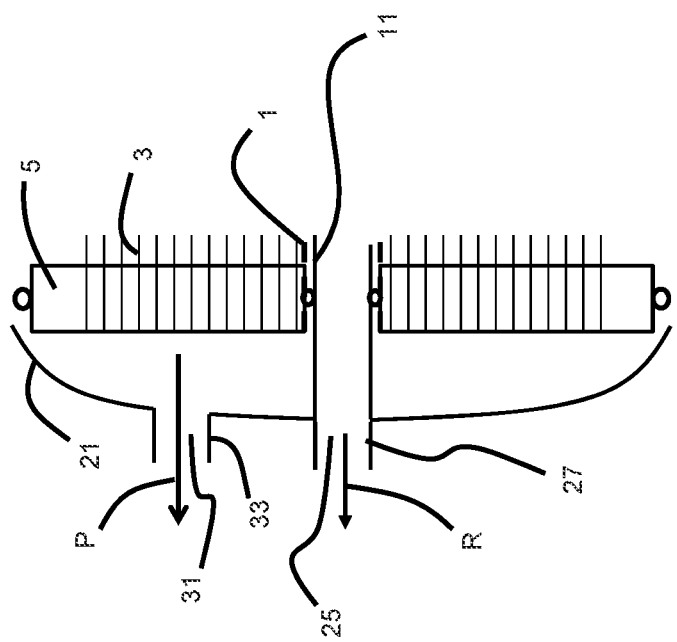

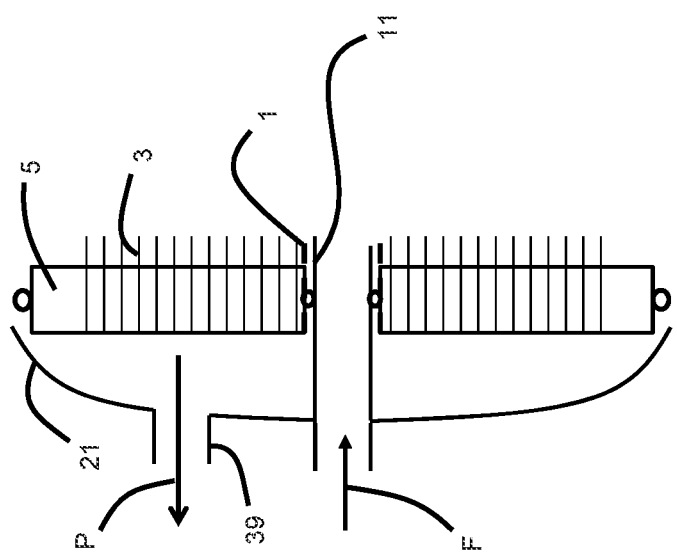

GAS SEPARATION MEMBRANE BUNDLE WITH CONVERTIBLE FLOW CONFIGURATIONS

CROSS-REFERENCE TO RELATED APPLICATIONS

This application is a continuation-in-part of U.S. patent application Ser. No. 17/835,961, filed Jun. 9, 2022.

BACKGROUND

Field of the Invention

The present invention relates to a gas separation membrane bundle for use in the simplified manufacturing of gas separation membrane modules having different flow configurations.

Related Art

Certain membrane-based gas separation applications benefit from a flow pattern characterized as cross-flow in which the feed gas flow direction is radial (with respect to the axis of the gas separation membrane bundle) while the permeate gas flow is perpendicular to the feed gas flow. For example, gas separation membrane modules for adjusting the hydrogen/carbon monoxide ratio in association with syngas product typically have a cross-flow configuration in order to minimize parasitic feed-side pressure drop. Membrane modules used in natural gas for acid gas removal typically provide a "bulk cut" separation such as reduction of $CO_2$ content from above 30% to around 10%. Such modules are typically cross-flow configuration as well to minimize parasitic pressure drop.

Other membrane-based gas separation applications instead benefit from a flow pattern characterized as countercurrent flow in which the feed gas flow direction is opposite that of the permeate gas flow. For example, a deep reduction of the $CO_2$ content of natural gas from around 10% to below 3% and recovery of Helium from natural gas benefit from a gas separation membrane module having a countercurrent flow configuration due to the maximization of the trans-membrane $CO_2$ or He partial pressure driving force for separation.

In still other applications, such as certain separation schemes utilizing multiple stages of gas separation membrane separation, the separation scheme is best designed with a stage including a gas separation membrane module with a cross-flow configuration and a stage including a gas separation membrane module with a countercurrent flow configuration.

In order to satisfy demand for gas membrane modules for each of the foregoing applications, manufacturers must have separate inventory and manufacturing lines for each gas flow configuration: cross-flow pattern and countercurrent-flow pattern. This necessitates a very large and varied inventory at the manufacturing facility. Such vendors must also stock gas separation membrane modules of each type of flow configuration. This, too, necessitates a very large footprint as well as a significant investment in inventory. Therefore, there is a need in the field of gas separation membrane modules for satisfying the foregoing gas separation needs without necessitating a very large footprint in the manufacturing facility or a significant investment in inventory.

SUMMARY

There is disclosed a hollow fiber membrane bundle that is convertible into a hollow fiber membrane module with a cross-flow configuration or a hollow fiber membrane module with a counter-current configuration, comprising hollow fiber membranes arranged around a porous support tube, a cured resin tubesheet formed at first end of the bundle, and either a cured resin nub or a cured resin tubesheet formed at a second end of the bundle, wherein: the bore(s) of the hollow fiber membranes are open at a face of the tubesheet adjacent the first end of the bundle; in the case of a cured resin nub formed at the second end of the bundle, the bore(s) of the hollow fiber membranes adjacent the second end of the bundle are blocked by the nub; the tubesheet adjacent the first end of the bundle has an annular structure that encapsulates the hollow fiber membranes and the support tube at the first end of the bundle but which does not completely block a bore of the porous support tube; in the case of a cured resin tubesheet formed at the second end of the bundle, the bore(s) of the hollow fiber membranes are open at a face of the tubesheet adjacent the second end of the bundle and the tubesheet adjacent the second end of the bundle has an annular structure that encapsulates the hollow fiber membranes and the support tube at the second end of the bundle but does not completely block a bore of the porous support tube; and the collection tube has a plurality of orifices formed in an outer circumferential surface of the collection tube at least at positions adjacent the nub or tubesheet adjacent the second end of the bundle.

There is disclosed a hollow fiber membrane bundle that is convertible into a hollow fiber membrane module with a cross-flow configuration or a hollow fiber membrane module with a counter-current configuration, comprising: hollow fiber membranes arranged around a porous support tube, a cured resin tubesheet formed at first end of the bundle, and a cured resin nub formed at a second end of the bundle. The bore(s) of the hollow fiber membranes are open at a face of the tubesheet adjacent the first end of the bundle. The tubesheet has an annular structure that encapsulates the hollow fiber membranes and the porous support tube at the first end of the bundle but which does not completely block a bore of the porous support tube, wherein the porous support tube has a plurality of orifices formed therein at least at positions adjacent the nub.

There is also disclosed a hollow fiber membrane module with a cross-flow configuration, comprising: a tubular pressure vessel; the above-described hollow fiber membrane bundle, the hollow fiber membrane bundle being concentrically disposed within the pressure vessel; a collection tube that is disposed concentrically within an open bore of the porous support tube, the collection tube having a first end adjacent the first end of the bundle, a second end adjacent the second end of the bundle, and a plurality of orifices at positions in between the tubesheet and the nub, wherein the tubesheet and the pressure vessel form a gas-tight seal at an interface where the an outer peripheral surface of the tubesheet is in contact with an inner surface of the pressure vessel and the collection tube and the tubesheet form a gas-tight seal at an interface where an outer peripheral surface of the collection tube is in contact with an inner surface of the tubesheet; and first and second end caps disposed at first and second ends of the tubular pressure vessel, the first and second caps and the first and second ends of the pressure vessel, respectively, forming gas-tight seals therebetween. The first end of the collection tube is in gas-tight fluid communication with a residue port that is formed in either the first end cap. The open bores of the hollow fiber membranes are in fluid communication with gas-tight permeate port that is formed in either the first end cap or in the pressure vessel at a position in between the tubesheet and the first end cap. The orifices of the collection tube are disposed at positions adjacent the nub, adjacent the tubesheet, and at positions between the nub and the tubesheet.

There is also disclosed a hollow fiber membrane module with a counter-current configuration, comprising: a tubular pressure vessel; the above-described hollow fiber membrane bundle, the hollow fiber membrane bundle being concentrically disposed within the pressure vessel; a collection tube that is disposed concentrically within an open bore of the porous support tube, the collection tube having a first end adjacent the first end of the bundle, a second end adjacent the second end of the bundle, and a plurality of orifices, wherein the tubesheet and the pressure vessel form a gas-tight seal at an interface where the an outer peripheral surface of the tubesheet is in contact with an inner surface of the pressure vessel and the collection tube and the tubesheet form a gas-tight seal at an interface where an outer peripheral surface of the collection tube is in contact with an inner surface of the tubesheet; first and second end caps disposed at first and second ends of the tubular pressure vessel, the first and second caps and the first and second ends of the pressure vessel, respectively, forming gas-tight seals therebetween, a first end of the collection tube being in gas-tight fluid communication with a residue port that is formed in the first end cap, the open bores of the hollow fiber membranes being in fluid communication with permeate port that is formed in either the first end cap or in the pressure vessel at a position in between the tubesheet and the first end cap; and a perforated film or fabric wrapped around a circumference of the hollow fiber membrane bundle in between the tubesheet and the nub, wherein the orifices of the collection tube are disposed only at positions adjacent the nub and the perforations of the film or fabric are disposed only at positions adjacent the tubesheet.

There is also disclosed a method of manufacturing a hollow fiber membrane bundle that is convertible into a hollow fiber membrane module with a cross-flow configuration or a hollow fiber membrane module with a counter-current configuration. The method comprises the following steps. Hollow fiber membranes are arranged around a porous support tube. A cured resin tubesheet is formed at a first end of the bundle. The tubesheet has an annular structure that encapsulates the hollow fiber membranes and the porous support tube at the first end of the bundle but which does not completely block a bore of the porous support tube. A cured resin nub is formed at a second end of the bundle. The bore(s) of the hollow fiber membranes are open at a face of the tubesheet adjacent the first end of the bundle and the porous support tube has a plurality of orifices formed therein at least at positions adjacent the nub.

There is also disclosed a method of manufacturing hollow fiber membrane module with a cross-flow configuration. The method comprises the following steps. The hollow fiber membrane bundle manufactured by the above-described method is provided. A collection tube is concentrically disposed into the open bore of the porous support tube, the collection tube having a first end adjacent the first end of the bundle, a second end adjacent the second end of the bundle, and a plurality of orifices as positions in between the tubesheet and the nub, the collection tube and the tubesheet forming a gas-tight seal at an interface where an outer peripheral surface of the collection tube is in contact with an inner surface of the tubesheet. The hollow fiber membrane bundle is concentrically disposed within a pressure vessel, the tubesheet and pressure vessel forming a gas-tight seal at an interface where an outer peripheral surface of the tubesheet is in contact with an inner surface of the pressure vessel. First and second end caps are secured at first and second ends of the tubular pressure vessel, respectively, the first and second caps and the first and second ends of the pressure vessel, respectively, forming gas-tight seals therebetween. The first end of the collection tube is in gas-tight fluid communication with a residue port that is formed in the first end cap. The open bores of the hollow fiber membranes are in fluid communication with a gas-tight permeate port that is formed in either the first end cap or in the pressure vessel at a position between the tubesheet and the first end cap. The orifices of the collection tube are disposed at positions adjacent the nub, adjacent the tubesheet, and at positions between the nub and the tubesheet.

There is also disclosed a method of manufacturing a hollow fiber membrane module with a counter-current configuration. The method comprises the following steps. The hollow fiber membrane bundle manufactured by the above-described method is provided. A collection tube is concentrically disposed into the open bore of the porous support tube, the collection tube having a first end adjacent the first end of the bundle, a second end adjacent the second end of the bundle, and a plurality of orifices as positions in between the tubesheet and the nub, the collection tube and the tubesheet forming a gas-tight seal at an interface where an outer peripheral surface of the collection tube is in contact with an inner surface of the tubesheet. A perforated film or fabric is wrapped around a circumference of the hollow fiber membrane bundle in between the tubesheet and the nub, wherein the orifices of the collection tube are disposed only at positions adjacent the nub and the perforations of the film or fabric are disposed only at positions adjacent the tubesheet. The film or fabric-wrapped hollow fiber membrane bundle is disposed concentrically within a pressure vessel, the tubesheet and pressure vessel forming a gas-tight seal at an interface where the an outer peripheral surface of the tubesheet is in contact with an inner surface of the pressure vessel. First and second end caps are secured at first and second ends of the tubular pressure vessel, respectively, the first and second caps and the first and second ends of the pressure vessel respectively forming gas-tight seals therebetween, wherein the first end of the collection tube is in gas-tight fluid communication with a residue port that is formed in the first end cap and the open bores of the hollow fiber membranes are in fluid communication with permeate port that is formed in either the first end cap or in the pressure vessel at a position between the tubesheet and the first end cap.

There is also disclosed a method of optimized manufacturing of hollow fiber membrane modules. First and second pluralities of the above hollow fiber membrane bundle are provided. A corresponding first plurality of hollow fiber membrane modules are manufactured using first one of the below-disclosed methods of manufacturing. A corresponding second plurality of hollow fiber membrane modules are manufactured using a second one of the below-disclosed methods of manufacturing. In one embodiment, the first method is a method of manufacturing a shell-fed hollow fiber membrane module with a cross-flow configuration while the second method is a method of manufacturing a shell-fed counter-current configuration. In another embodiment, the first method is a method of manufacturing a bore-fed hollow fiber membrane module with a cross-flow configuration while the second method is a method of manufacturing a bore-fed counter-current configuration. In another embodiment, the first method is a method of manufacturing a shell-fed hollow fiber membrane module while the second method is a method of manufacturing a bore-fed counter-current configuration.

There is also disclosed another method of optimized manufacturing of hollow fiber membrane modules having a cross-flow configuration and hollow fiber membrane modules having a counter-current configuration. The method comprises the following steps. First and second pluralities of the hollow fiber membrane bundles manufactured by the above-described method are stored. Each of a first plurality of collection tubes is concentrically disposed into the open bore of the porous support tube of respective ones of the first plurality of hollow fiber membrane bundles. Each collection tube has a first end adjacent the first end of a respective one of the first plurality of hollow fiber membrane bundles, a second end adjacent the second end of a respective one of the first plurality of hollow fiber membrane bundles, and a plurality of orifices at positions in between the tubesheet and the nub of a respective one of the first plurality of hollow fiber membrane bundles. Each collection tube and tubesheet of each one of the first plurality of hollow fiber membrane bundles forming a gas-tight seal at an interface where an outer peripheral surface of the collection tube is in contact with an inner surface of the tubesheet. Each of the plurality of hollow fiber membrane bundles is concentrically disposed within a respective one of a first plurality of pressure vessels, each of the tubesheets of the first plurality of hollow fiber membrane bundles forming a gas-tight seal with a respective one of the first plurality of pressure vessels at an interface where an outer peripheral surface of the respective tubesheet is in contact with an inner surface of the respective pressure vessel. Each of a first plurality of first end caps and each of a first plurality of second end caps is secured at first and second ends of respective ones of the first plurality of pressure vessels, the associated first and second caps and first and second pressure vessel ends forming gas-tight seals therebetween. Each first end of the first plurality of collection tubes is in gas-tight fluid communication with a residue port that is formed in a respective one of the first plurality of first end caps. The open bores of the hollow fiber membranes of each of the first plurality of hollow fiber membrane bundles are in fluid communication with a gas-tight permeate port that is formed in either the associated first end cap or in the associated pressure vessel at a position between the associated tubesheet and the associated first end cap. The orifices of the collection tube of each of the first plurality of hollow fiber membrane bundles are disposed at positions adjacent the associated nub, adjacent the associated tubesheet, and at positions between the associated nub and the tubesheet. Each of a second plurality of collection tubes is concentrically disposed into the open bore of the porous support tube of respective ones of the second plurality of hollow fiber membrane bundles. Each collection tube has a first end adjacent the first end of a respective one of the second plurality of hollow fiber membrane bundles, a second end adjacent the second end of a respective one of the second plurality of hollow fiber membrane bundles, and a plurality of orifices at positions in between the tubesheet and the nub of a respective one of the second plurality of hollow fiber membrane bundles. Each collection tube and tubesheet of each one of the second plurality of hollow fiber membrane bundles forming a gas-tight seal at an interface where an outer peripheral surface of the collection tube is in contact with an inner surface of the tubesheet. Each of a plurality of perforated films or fabrics is wrapped around a circumference of a respective one of the second plurality of hollow fiber membrane bundles in between the associated tubesheet and the associated nub, wherein the orifices of the collection tube of each of the first plurality of hollow fiber membrane bundles are disposed only at positions adjacent the associated nub and the perforations of the associated film or fabric are disposed only at positions adjacent the associated tubesheet. Each of the plurality of film or fabric-wrapped hollow fiber membrane bundles concentrically disposed within a respective one of a second plurality of pressure vessels, the tubesheet of each of the second plurality of hollow fiber membrane bundles and a respective one of the second plurality of pressure vessels forming a gas-tight seal at an interface where the an outer peripheral surface of the associated tubesheet is in contact with an inner surface of the associated pressure vessel. A second plurality of first end caps and a second plurality of second end caps is secured at respective ones of first and second ends of the second plurality of pressure vessels, the associated first and second caps and the associated first and second ends of the pressure vessel respectively forming gas-tight seals therebetween, wherein each first end of the second plurality of collection tubes is in gas-tight fluid communication with an associated residue port that is formed in the associated first end cap and the open bores of the hollow fiber membranes of the second plurality of hollow fiber membrane bundles are in fluid communication with associated permeate port that is formed in either the associated first end cap or in the associated pressure vessel at a position between the associated tubesheet and the associated first end cap.

Any of the above-described hollow fiber membrane bundle, hollow fiber membrane modules, and methods of manufacturing may include of the following aspects:

the plurality of orifices are formed in the porous support tube at positions only adjacent the nub.

the plurality of orifices are formed in the porous support tube at positions adjacent to the tubesheet, positions adjacent to the nub, and positions in between the tubesheet and nub.

the hollow fiber membranes are spirally wrapped around the porous support tube.

the hollow fiber membranes are parallel to an axis of the porous support tube.

a cured resin nub, and not a cured resin tubesheet, is formed at a second end of the bundle, and the collection tube and the tubesheet forms a gas-tight seal at an interface where an outer peripheral surface of the collection tube is in contact with an inner surface of the tubesheet.

the plurality of orifices are disposed at positions adjacent to the tubesheet, positions adjacent to the nub, and positions in between the tubesheet and nub.

the plurality of orifices are disposed only at positions adjacent the nub and not at positions adjacent the tubesheet.

a cured resin tubesheet, and not a cured resin nub, is formed at a second end of the bundle, and the collection tube and the tubesheets form gas-tight seals at interfaces where an outer peripheral surface of the collection tube is in contact with inner surfaces of the tubesheets.

the plurality of orifices are disposed at positions adjacent to the tubesheet, positions adjacent to the nub, and positions in between the tubesheet and nub.

the plurality of orifices are disposed only at a middle portion of the collection tube or adjacent to the middle portion and are not disposed at positions adjacent the tubesheets.

the plurality of orifices are disposed only at positions adjacent the tubesheets and not at a middle portion of the collection tube or adjacent to the middle portion.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1A is a side view of a porous collection tube

FIG. 1B is a cross-sectional side view of the porous collection tube of FIG. 1A.

FIG. 2B is a cross-sectional side view of one embodiment of the inventive bundle.

FIG. 3A is a side view of one embodiment of the collection tube.

FIG. 3B is a cross-sectional side view of the collection tube of FIG. 3A.

FIG. 4A is a side view of another embodiment of the collection tube.

FIG. 4B is a cross-sectional side view of the collection tube of FIG. 4A.

FIG. 5A is a side view of another embodiment of the collection tube.

FIG. 5B is a cross-sectional side view of the collection tube of FIG. 5A.

FIG. 6A is a side view of another embodiment of the collection tube.

FIG. 6B is a cross-sectional side view of the collection tube of FIG. 6A.

FIG. 9B is a schematic view of another embodiment of the inventive module.

FIG. 9D is a schematic view of another embodiment of the inventive module.

FIG. 10A is a schematic view of another embodiment of the inventive module.

FIG. 10C is a schematic view of another embodiment of the inventive module.

FIG. 11B is a schematic view of another embodiment of the inventive module.

FIG. 16 is a partial view schematic of one embodiment of the inventive module.

FIG. 17 is a partial view schematic of one embodiment of the inventive module.

DESCRIPTION OF PREFERRED EMBODIMENTS

Figure 2A:
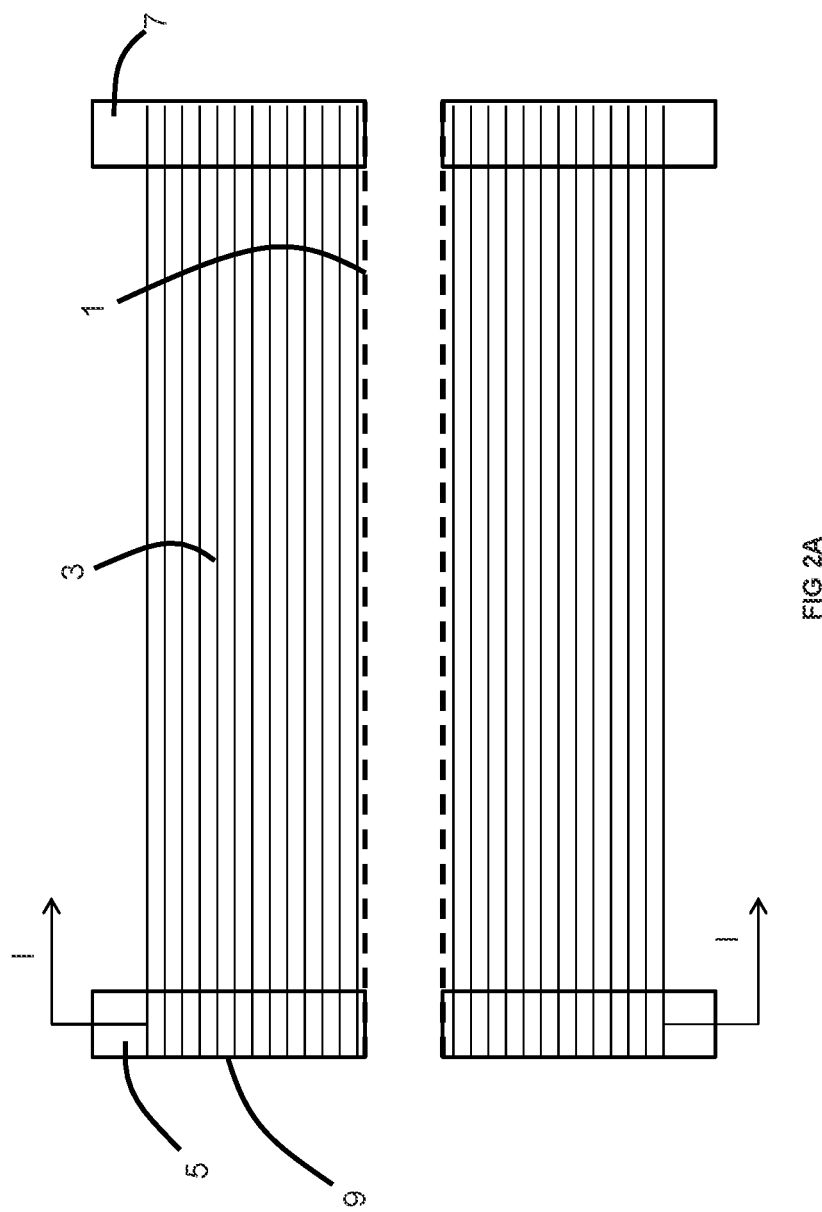
FIG. 2A is a cross-sectional side view of one embodiment of the inventive bundle.

In order to reduce the complexity of manufacturing hollow fiber membrane modules having a variety of flow patterns, a novel intermediate hollow fiber membrane bundle and its method of manufacturing is described herein. Its structure and method of manufacturing allow the same structure to be finished as a hollow fiber membrane module with cross-flow configuration or a hollow fiber membrane module with counter-current configuration. It may also be finished with a radially inward, shell-fed configuration or a radially outward, shell-fed configuration. It may also be finished with a bore-fed configuration. It may also be finished with either a single-end configuration or a double-end configuration.

Because only one (or optionally two) type of intermediate bundle is necessary, the invention minimizes the process steps, complexity, inventory, and manufacturing facility footprint required for manufacturing these two different flow configurations. It also results in relatively lower downtime for the manufacturing line, with relatively greater efficiency. Finally, the likelihood of human error is decreased.

In comparison to conventional manufacturing techniques, the counter-current module is fabricated using the same manufacturing steps as the cross-flow module but utilizes two different types of collection tubes, and in the case of a counter-current module, an external wrap (of film or fabric) that is substantially impermeable to the feed gas. The distinct advantage of the bundle design found in the later part of the manufacturing process is inventory management. Maintaining separate inventories of both cross-flow and counter-current bundles or inventories of both cross-flow and counter-current modules is not required as the final manufacturing steps can be accomplished in little time but have significant impact on the final product performance.

Also in comparison to conventional manufacturing techniques, shell-fed, bore-fed, single-ended, or double-ended modules may be manufactured starting with only one (or optionally two) type of membrane bundle. Again, the distinct advantage of the bundle design found in the later part of the manufacturing process is inventory management. Maintaining separate inventories of radially inward, shell-fed bundles, radially outward, shell-fed bundles, single-ended bundles, double-ended bundles, radially outward, bore-fed bundles, and radially inward bore-fed bundles is not required as the final manufacturing steps can be accomplished in little time but have significant impact on the final product performance. The inventors have truly provided a universal membrane bundle design from which a tremendous variety of gas separation membrane modules with flow configurations may be manufactured.

Certain bulk cut membrane-based gas separations benefit from the cross-flow configuration. In these applications, the separation efficiency is not significantly improved by the counter-current configuration while parasitic pressure drops are avoided. For recovery of dilute He gas or reduction of $CO_2$ or $H_2S$ content of methane mixtures (such as natural gas or biogas) to low levels (e.g., <5%), a counter-current flow configuration is preferred for superior separation performance. Maintaining separate inventories of these two different flow configurations is not required as the final module configuration steps can be accomplished quickly and cost-effectively, but have significant impact on the final module performance in specific applications.

We will first describe the different type of flow configurations in gas separation membrane modules.

A hollow fiber membrane bundle is considered to be shell-side fed if it is designed, after being finished as a hollow fiber membrane module, to allow a feed gas to be fed to the membranes from outside the outer walls of the membranes, a permeate gas is collected from exposed bores of the membranes at the first end of the bundle or from each of the ends of the bundle, and a residue gas is collected either from a centrally-disposed collection tube or from a residue port formed in a pressure vessel containing the bundle. On the other hand, a hollow fiber bundle is considered to be bore-fed if it is designed, after being finished as a hollow fiber membrane module, to allow a feed gas to be fed into the bores of the membranes at one end of the bundle, a residue gas is collected from the bores of the membranes at the opposite end of the bundle, and a permeate gas is collected either from a centrally-disposed collection tube or from a residue port formed in a pressure vessel containing the bundle.

A shell-fed hollow fiber membrane bundle is considered to be single-ender (aka single-ender) if it is designed, after being finished as a hollow fiber membrane module, to have a tubesheet formed only at one end of the bundle while a nub is formed at the other end of the bundle. Because permeate gas is withdrawn only from the bores of the fibers at the tubesheet end, the permeate gas flows within the fibers in a direction from the nub towards the tubesheet.

A hollow fiber membrane bundle is considered to be cross-flow if it is designed, after being finished as a hollow fiber membrane module, to provide for a flow of feed gas that is generally perpendicular to the flow of permeate gas. On the other hand, a hollow fiber membrane bundle is considered to be counter-flow if it is designed, after being finished as a hollow fiber membrane module, to provide for a flow of feed gas that is generally opposite to the flow of permeate gas.

In any case, feed gas (comprised of at least first and second gases intended to be separated by the hollow fiber membrane module) flows across the walls of the membranes either from an exterior (in which case it is shell-fed) or from an interior (in which case it is bore-fed). The composition of the separation layer of the membranes is selected to exhibit a higher permeability of one of the first and second gases in the separation layer and a lower permeability of the other of the first and second gases. Thus, the first gas permeates at a higher rate (in comparison to the second gas) through walls of the membranes where it concentrates in the permeate gas and becomes deficient in the residue gas. Conversely, the second gas permeates at a lower rate through the walls and instead concentrates in the residue gas and becomes deficient in the permeate gas.

We will now describe the porous support tube, the inventive membrane bundle, and the inventive collection tube.

As shown in FIGS. 1-2, the inventive bundle starts with a porous support tube 1 is provided. It has a porosity that does not pose any substantial resistance to gas flow.

As shown in FIG. 2A, hollow fiber membrane bundle includes hollow fiber membranes 3 arranged around porous support tube 1. A cured resin tubesheet 5 is formed at a first end of the bundle while a cured resin nub 7 is formed at a second end of the bundle. The tubesheet 5 has an annular configuration that encapsulates the membranes 3 and the porous support tube 1 at the first end of the bundle but does not completely block the open bore of the porous support tube 10. The face 9 of the tubesheet 5 adjacent to the first end (i.e., facing away from the membranes 3) is machined so as to expose the bores of the membranes 3. On the other hand, the nub 7 completely blocks the ends of the membranes 3 at the second end of the bundle.

Alternatively and as shown in FIG. 2B, the hollow fiber membrane bundle similarly includes hollow fiber membranes 3 arranged around porous support tube 1. Instead of a tubesheet and a nub as in FIG. 2A, the bundle of FIG. 2B includes cured resin tubesheets 5 formed at each of the first and second ends of the bundle. Each tubesheet 5 has an annular configuration that encapsulates the membranes 3 and the porous support tube 1 at the first and second ends of the bundle but does not completely block the open bore of the porous support tube 1. The faces 9 of the tubesheets 5 (i.e., facing away from the membranes 3) is machined so as to expose the bores of the membranes 3. In this embodiment, a tubesheet may be formed from the nub 7 of the bundle of FIG. 2A by machining the outer edge of the nub 7 so as to provide a face similar to face 9 of the tubesheet 5.

The hollow fiber membranes 3 of the membrane bundles of FIGS. 2A, 2B are illustrated as being parallel to one another and parallel to an axis of the porous support tube 1. The hollow fibers 3 may be aligned parallel to one another on a sheet substrate and the fiber/substrate spirally wound around the porous support tube 1. Alternatively, the hollow fibers 3 may first be woven with a weft thread to form a fabric and the fabric spirally wound around the porous support tube 1.

Figure 2C:
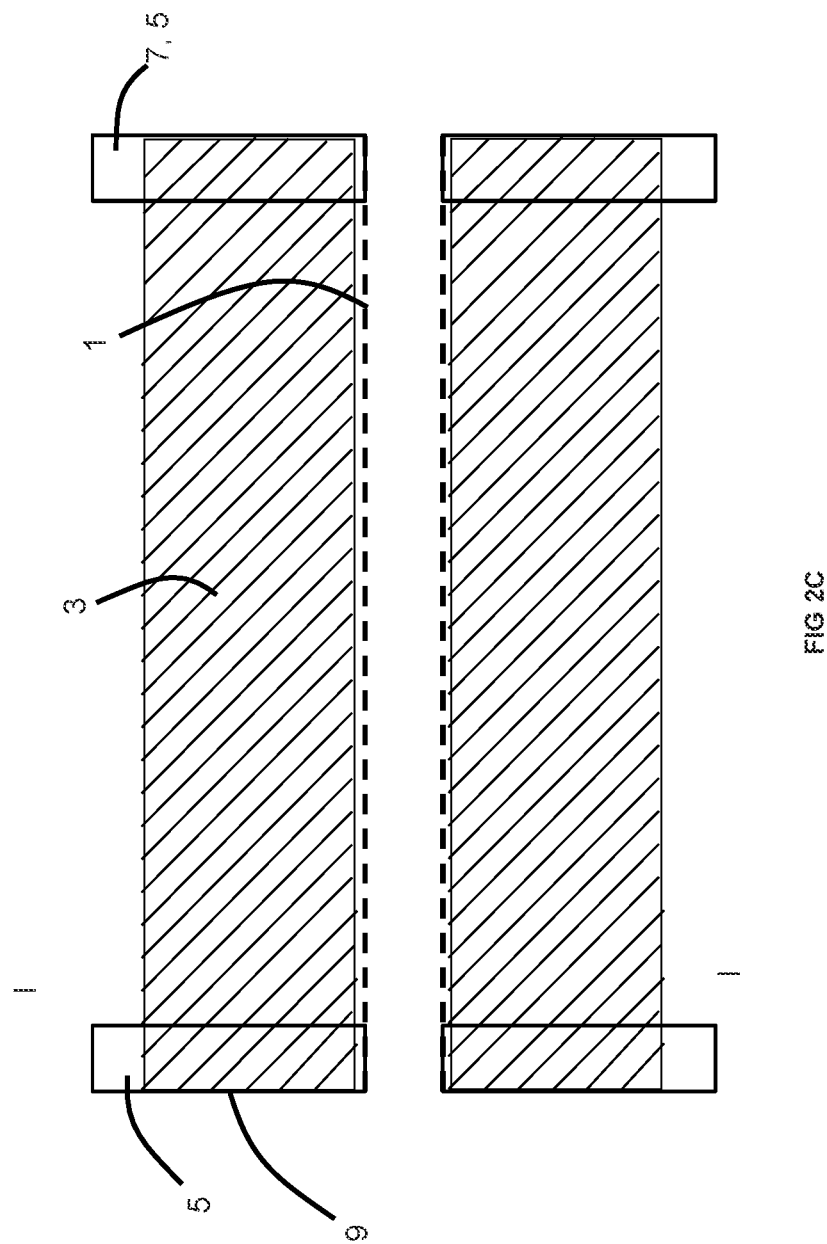
FIG. 2C is a cross-sectional side view of one embodiment of the inventive bundle.

As seen in FIG. 2C, instead of the arrangement of FIGS. 2A, 2B, the hollow fiber membranes or tows of hollow fiber membranes 3 may be spirally wound around a porous support tube 1 at an angle thereto so that, as the membranes 3 or tows of membranes 3 are wound around the porous support tube 1, the membranes 3 or tows of membranes 3 travel from side to side along the bundle. Although the embodiments illustrated in FIGS. 7A-12B illustrate the arrangement of FIGS. 2A, 2B, one of ordinary skill in the art will understand that the arrangement of FIG. 2C may easily be substituted without any change in the inventive nature of the membrane bundle.

The tubesheet 5 may be made of any curable resinous material known in the field of gas separation membranes and cured after application to the first end of the bundle. For example, it may be made of any epoxy, optionally with one or more hardeners and/or fillers. Alternatively, the tubesheet could be made of a thermoplastic polymer resin and injected into the fiber mass to form the tubesheet. After the tubesheet 5 is formed and cured, the end of the bundle, including the tubesheet 5 and membranes 3, is machined away to form a face 9 and expose the bores of the membranes 3. The nub 7 may be made of the same or different curable resinous material as the tubesheet 5. During the forming process, forming materials can be applied to the fiber bundle to provide a surface for sealing the bundle to the vessel inner diameter. In the case of a bundle including a nub 7, the purpose of the nub 7 is to block flow of gas, thus forcing all permeating gas to exit via the open face 9.

In one aspect of the invention, two different types of flow configuration hollow fiber membrane modules may be manufactured using the above-described hollow fiber membrane bundle. A collection tube, that includes orifices formed therein, is concentrically disposed within the bore of the porous support tube 1 to form a hollow fiber membrane bundle assembly. Depending upon where the orifices are positioned and whether a special wrapped film or fabric is present, the collection tube 1 may be designed for a cross-flow configuration or a counter-flow configuration. The bundle assembly is concentrically disposed within a pressure vessel.

The tubesheet 5 and the pressure vessel form a gas-tight seal, optionally with the use of a seal (such as an O-ring or cup-ring and O-ring combination), at an interface where an outer circumferential surface of the tubesheet 5 is in contact with an inner surface of the pressure vessel. Similarly, the collection tube and the tubesheet 13 form a gas-tight seal, optionally with the use of a seal (such as an O-ring or cup-ring and O-ring combination), at an interface where an outer peripheral surface of the collection tube is in contact with an inner surface of the tubesheet 5.

A first end cap is secured in gas-tight fashion to a first end of the pressure vessel that is adjacent the first end of the bundle. Also, a second end cap is secured in gas-tight fashion to a second end of the pressure vessel that is adjacent the second end of the bundle. The first and second end caps and the first and second ends of the pressure vessel, respectively, forming gas-tight seals therebetween, optionally with the use of a seal (such as an O-ring or cup-ring and O-ring combination). If the length of the bundle is substantially the same as that of the pressure vessel, the first and second end caps may be dished in order to provide a permeate gas collection space in between the tubesheet 5 and the first end cap. if the length of the bundle is shorter than the pressure vessel, then the first and second end caps need not be dished because a permeate collection space in between the tubesheet 5 and the first end cap will already be present.

Figure 2D:
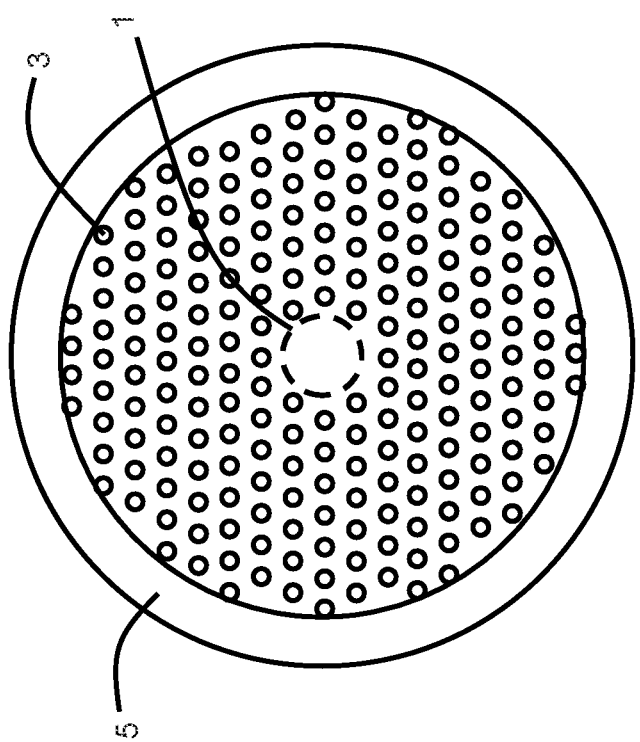
FIG. 2D is a cross-sectional end view of the embodiments of the inventive bundle of FIG. 2A.

As seen in FIG. 2D, a portion of the tubesheet 5 not containing membranes 3 extends beyond the portion that does contain membranes 3. The porous support tube 1 is centrally disposed with respect to the tubesheet 5.

As seen below in the embodiments of FIGS. 7A-12B, the collection tube (described below) may be use to collect permeate gas or residue gas or to feed the feed gas to the membranes.

As seen in FIGS. 3A, 3B, the collection tube 11 may have a plurality of orifices 13 at positions extending along (or substantially along) the entire length of the collection tube 11. In other words, the orifices 13 are disposed at positions adjacent to the tubesheet(s) 5, positions adjacent to the nub 7, and positions in between the tubesheet 5 and nub 7.

Alternatively and as seen in FIG. 4A, 4B, the collection tube 11 may have a plurality of orifices 13 disposed only at positions adjacent the nub 7 and not at positions adjacent the tubesheet 5 (in the embodiments including a tubesheet and a nub). By adjacent, we mean that the orifices 13 are disposed at locations only to an extent of being, at most, 25% of the length of the porous support tube 1 away from the tubesheet 5. Typically, the orifices 13 are disposed at locations only to an extent of being, at most, 15% of the length of the porous support tube 1 away from the tubesheet 5. More typically, the orifices 13 are disposed at locations only to an extent of being, at most, 10% of the length of the porous support tube 1 away from the tubesheet 5.

Alternatively and as seen in FIGS. 5A, 5B, the collection tube 11 may have a plurality of orifices 13 are disposed only at a middle portion of the collection tube or adjacent to the middle portion and are not disposed at positions adjacent the tubesheets. By adjacent to the middle portion, we mean no more than 25% of the length of the length of the porous support tube 1 away from the center (in the axial direction) of the he porous support tube 1. Typically, it is no more than 15% of the length of the length of the porous support tube 1 away from the center (in the axial direction) of the he porous support tube 1. More typically, it is no more than 10% of the length of the length of the porous support tube 1 away from the center (in the axial direction) of the he porous support tube 1.

Alternatively and as seen in FIGS. 6A, 6B, the plurality of orifices 13 are disposed only at positions adjacent the tubesheets and not at a middle portion of the collection tube or adjacent to the middle portion. By adjacent, we mean that the orifices 13 are disposed at locations only to an extent of being, at most, 25% of the length of the porous support tube 1 away from one of the tubesheets 5. Typically, the orifices 13 are disposed at locations only to an extent of being, at most, 15% of the length of the porous support tube 1 away from one of the tubesheets 5. More typically, the orifices 13 are disposed at locations only to an extent of being, at most, 10% of the length of the porous support tube 1 away from the tubesheets 5.

We will now explain the various flow patterns that may be achieved with the inventive bundle.

Figure 7A:
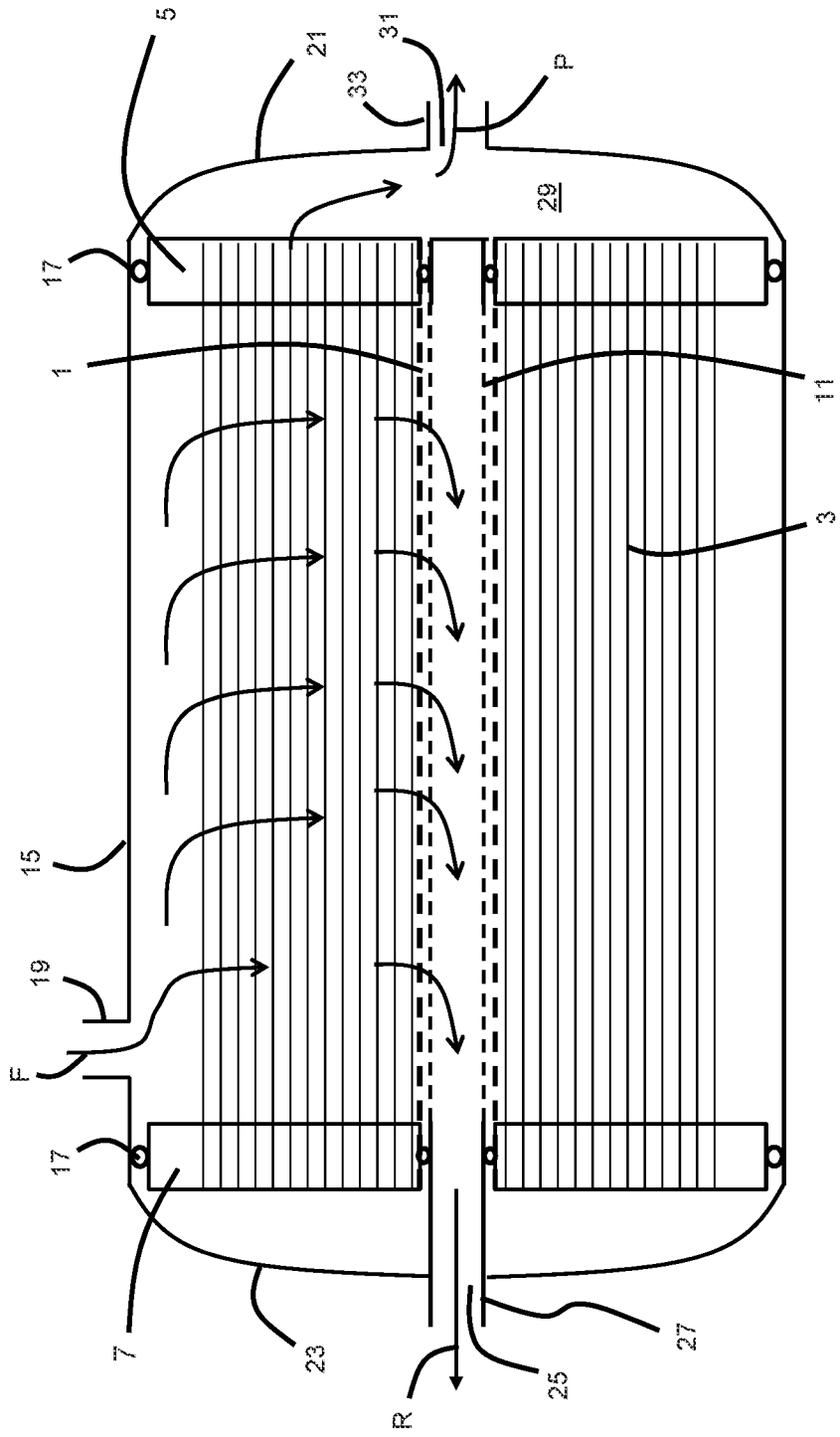
FIG. 7A is a schematic view of one embodiment of the inventive module.

As seen in FIG. 7A, a single-ended, radially inward, shell-fed, hollow fiber membrane module with a cross-flow configuration may be manufactured as follows. The hollow fiber membrane bundle of FIG. 2A or 2C is disposed concentrically within a pressure vessel 15. Seals 17 are disposed at interfaces where an outer circumferential surface of the tubesheet 5 is in contact with an inner surface of the pressure vessel 15 and where an outer circumferential surface of the nub 7 is in contact with an inner surface of the pressure vessel 15. This forms a gas-tight seal between the tubesheet 5 and the pressure vessel 15 and between the nub 7 and the pressure vessel 15. The collection tube 11 utilized in this embodiment is that of FIGS. 3A, 3B. The orifices are disposed at positions adjacent the nub 7, at positions adjacent the tubesheet 5, and at positions between the nub 7 and tubesheet 5. Typically, they are formed uniformly across the collection tube 11.

A feed gas port 19 is formed in the pressure vessel at a position between the nub 7 and the tubesheet 5. A first end cap 21 and a second end cap 23 are secured, at the second and first ends of the bundle, to opposite ends of the pressure vessel 15 in a gas-tight manner. It should be noted that the bundle illustrated in FIG. 7A is oriented in a direction reverse of that shown in FIGS. 2A, 2C. The first end of the collection tube 11 is in gas-tight fluid communication with a residue port 25 that is formed in the second end cap via a residue outlet tube 27. A first end of the residue outlet tube 27 is attached to the first end of the collection tube 11 adjacent the first end of the bundle and a second end of the residue outlet tube 27 extends out of the residue port 25. The second end of the collection tube 11 is blocked to form a gas-tight seal between the collection tube 11 and a space 29 adjacent the first end cap 21. The open bores of the hollow fiber membranes 3 are in fluid communication with a gas-tight permeate port 31 that is formed in either the first end cap 21 (or optionally in the pressure vessel 15 at a position between the tubesheet 5 and the first end cap 21).

The open bores of the hollow fiber membranes 3 are in fluid communication with a gas-tight permeate port 31 that is formed in the first end cap (or optionally in the pressure vessel 15 at a position between the tubesheet 5 and the first end cap 21).

In operation, a flow of feed gas F enters the module via the feed gas port 19 and contacts the membranes 3. The permeate enters the bores of the membranes 3 and a flow of permeate P is withdrawn from the module via the permeate port 31 and permeate outlet tube 33. The retentate flows over the membranes 3, past the porous support tube 1 and through orifices in the collection tube 11. A flow of retentate R is withdrawn from the module via the retentate port 27 and retentate outlet tube 27. The flow pattern in FIG. 7A is considered cross-flow because the flow of feed across the bundle is generally perpendicular to the direction of the flow of permeate through the bores of the membranes 3.

Figure 7B:
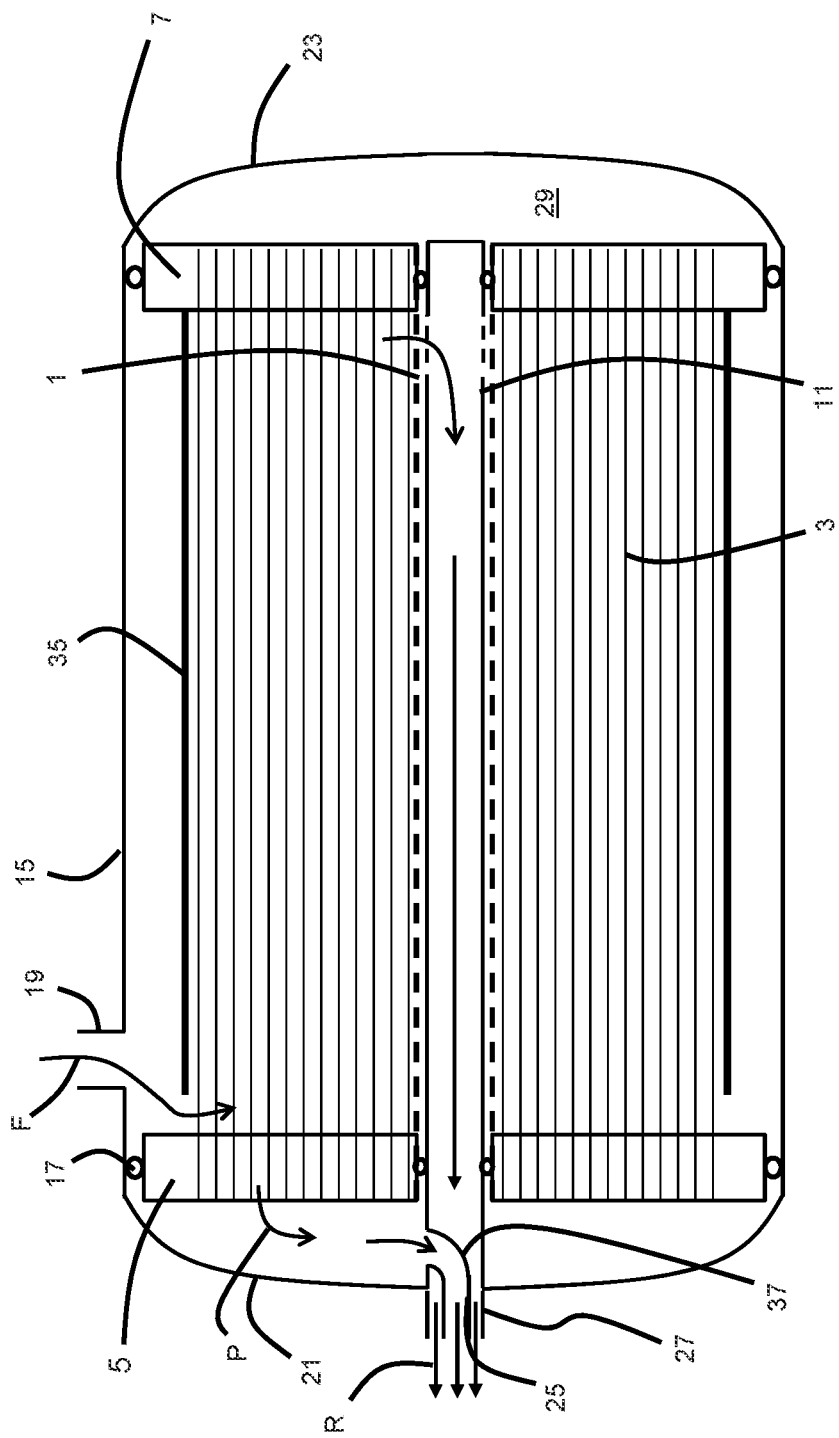
FIG. 7B is a schematic view of another embodiment of the inventive module.

As seen in FIG. 7B, a single-ended, shell-fed, hollow fiber membrane module with a counter-current configuration may be manufactured as follows. A film or fabric 35 is wrapped around a portion of the circumference of the hollow fiber membrane bundle of FIG. 2A or 2C. It is contiguous with the tubesheet 5 to leave a gap in between the tubesheet 5 and an end of the film or fabric 35. The film or fabric-wrapped hollow fiber membrane bundle is disposed concentrically within the pressure vessel 15. The collection tube 11 utilized in this embodiment is that of FIGS. 4A, 4B. The orifices are disposed only at positions adjacent the nub and not at positions adjacent the tubesheet.

The film or fabric 35 wrap serves as a non-permeable barrier between the feed gas and the membranes 3. The wrap 35 (here in and in other embodiments also using a film or fabric wrap) may be an impermeable film, i.e. polyethylene terephthalate (PET) or the like or a composite fabric, or it may rendered impermeable by coating material. Alternately, the wrap 35 (here and in other embodiments also using a film or fabric wrap) may be a shrink sleeve material that is installed over the bundle and subsequently heat-shrunk onto it. Typically, one end of the impermeable wrap 35 is attached to the nub 7 and is positioned such that at least 5% of the bundle length, measured away from an inner edge of tubesheet 5 is not covered. The feed gas enters the bundle through the non-covered gap in between the tubesheet 5 and the edge of the wrap 35. In this embodiment, the direction of the feed gas is substantially parallel and opposite to that of the flow of the permeate. Thus, it is referred to as "counter-flow".

Seals 17 are disposed at interfaces where an outer circumferential surface of the tubesheet 5 is in contact with an inner surface of the pressure vessel 15 and where an outer circumferential surface of the nub 7 is in contact with an inner surface of the pressure vessel 15. This forms a gas-tight seal between the tubesheet 5 and the pressure vessel 15 and between the nub 7 and the pressure vessel 15. A feed gas port 19 is formed in the pressure vessel at a position between the nub 7 and the tubesheet 5. A first end cap 21 and a second end cap 23 are secured secured, at the second and first ends of the bundle, to opposite ends of the pressure vessel 15 in a gas-tight manner. The first end of the collection tube 11 is in gas-tight fluid communication with a residue port 25 that is formed in the second end cap via a residue outlet tube 27. A first end of the residue outlet tube 27 is attached to the first end of the collection tube 11 adjacent the first end of the bundle and a second end of the residue outlet tube 27 extends out of the residue port 25. The second end of the collection tube 11 is blocked to form a gas-tight seal between the collection tube 11 and a space 29 adjacent the first end cap 21.

As shown in FIG. 7B, the open bores of the hollow fiber membranes 3 are in fluid communication with a permeate outlet tube 37 extending into and along a bore of the residue outlet tube 27 and out the residue port 25. The permeate outlet tube 37 is sealed from the residue outlet tube 27 so as to prevent residue from leaking into the permeate outlet tube 37. Alternatively and as shown in FIG. 16, the open bores of the hollow fiber membranes 3 are in fluid communication with a permeate port 39 formed in the first end cap or in the pressure vessel at a position between the tubesheet and the second end cap.

In operation, a flow of feed gas F enters the module via the feed gas port 19 and contacts the membranes 3. The feed gas flows past the gap between the film or fabric 35 and tubesheet 5 and into the bundle. The permeate enters the bores of the membranes 3 and a flow of permeate P is withdrawn from the module via the permeate outlet tube 37. As illustrated in FIG. 7B, the permeate outlet tube enters into the residue outlet tube 27 and extends along a bore thereof. The retentate flows over the membranes 3, past the porous support tube 1 and through orifices in the collection tube 11 at positions adjacent the nub 7. A flow of retentate R is withdrawn from the module via the retentate port 27 and retentate outlet tube 27. The flow pattern in FIG. 7B is considered counter-flow because the flow of feed across the bundle is generally opposite the direction of the flow of permeate through the bores of the membranes 3.

Figure 8A:
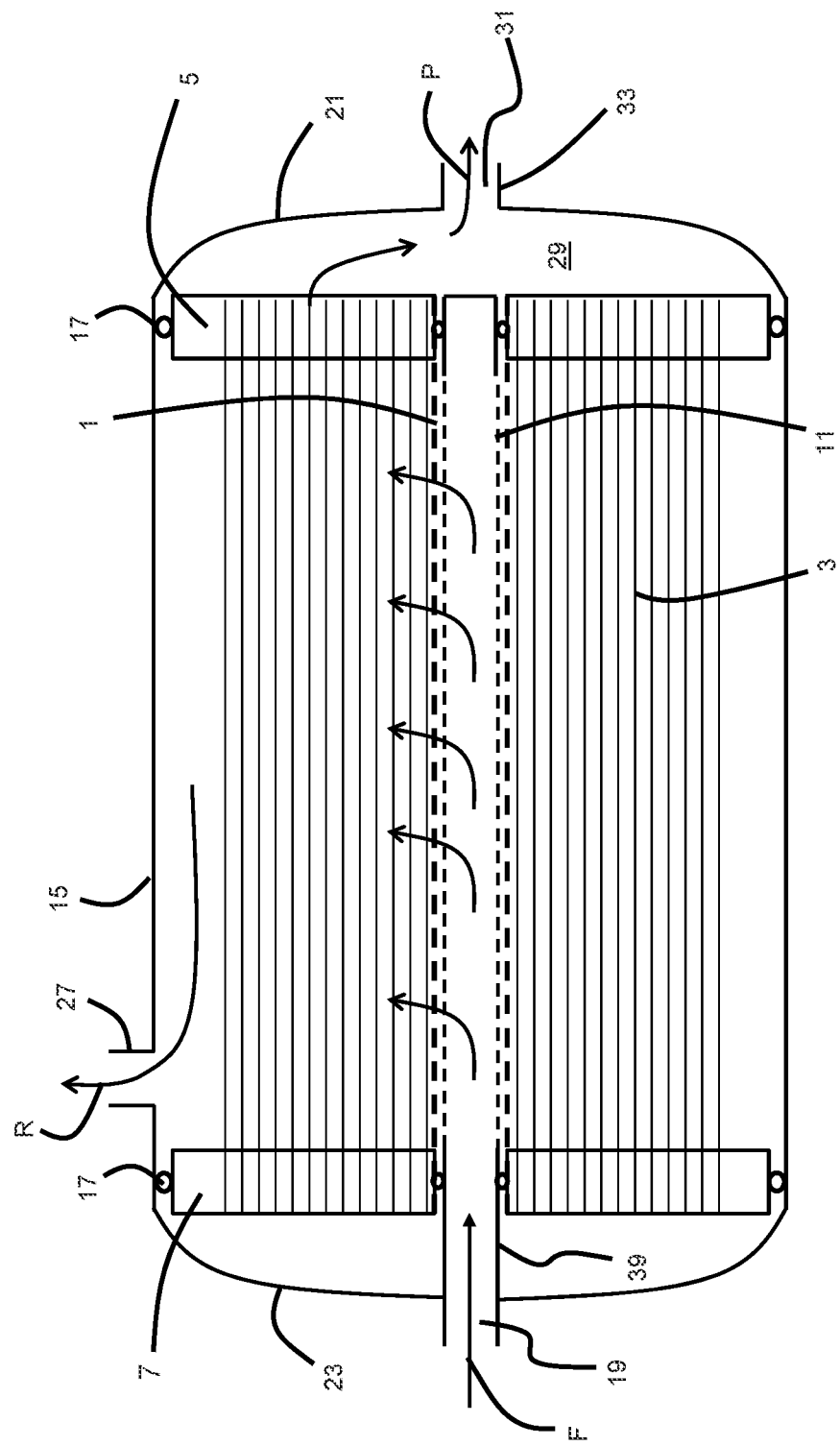
FIG. 8A is a schematic view of another embodiment of the inventive module.

As seen in FIG. 8A, a single-ended, radially outward, shell-fed, hollow fiber membrane module with a cross-flow configuration may be manufactured as follows. The hollow fiber membrane bundle of FIG. 2A or 2C is concentrically disposed within a pressure vessel 15. Seals 17 are disposed at interfaces where an outer circumferential surface of the tubesheet 5 is in contact with an inner surface of the pressure vessel 15 and where an outer circumferential surface of the nub 7 is in contact with an inner surface of the pressure vessel 15. This forms a gas-tight seal between the tubesheet 5 and the pressure vessel 15 and between the nub 7 and the pressure vessel 15. The collection tube 11 utilized in this embodiment is that of FIGS. 3A, 3B. The orifices are disposed at positions adjacent the nub 7, at positions adjacent the tubesheet 5, and at positions between the nub 7 and tubesheet 5. Typically, they are formed uniformly across the collection tube 11.

A first end cap 21 and a second end cap 23 are secured. at the second and first ends of the bundle, to opposite ends of the pressure vessel 15 in a gas-tight manner. It should be noted that the bundle illustrated in FIG. 8A is oriented in a direction reverse of that shown in FIGS. 2A, 2C. A feed gas port 19 is formed in the second end cap 23. The first end of the collection tube 11 is in gas-tight fluid communication with the feed gas port 19 via a feed gas inlet tube 39. The second end of the collection tube 11 is blocked to form a gas-tight seal between the collection tube 11 and a space 29 adjacent the first end cap 21. The open bores of the hollow fiber membranes 3 are in fluid communication with a permeate port 31 that is formed in the first end cap 21 (or optionally in the pressure vessel 15 at a position between the tubesheet 5 and the first end cap 21).

In operation, a flow of feed gas F enters the module via the feed gas port 19 and feed gas inlet tube 39. It flows through orifices in the collection tube and contacts the membranes 3. The permeate enters the bores of the membranes 3 and a flow of permeate P is withdrawn from the module via the permeate port 31 and permeate outlet tube 33. The retentate flows over the membranes 3, past the porous support tube 1 and through orifices in the collection tube 11. A flow of retentate R is withdrawn from the module via the retentate port 27 and retentate outlet tube 27. The flow pattern in FIG. 8A is considered cross-flow because the flow of feed across the bundle is generally perpendicular to the direction of the flow of permeate through the bores of the membranes 3.

Figure 8B:
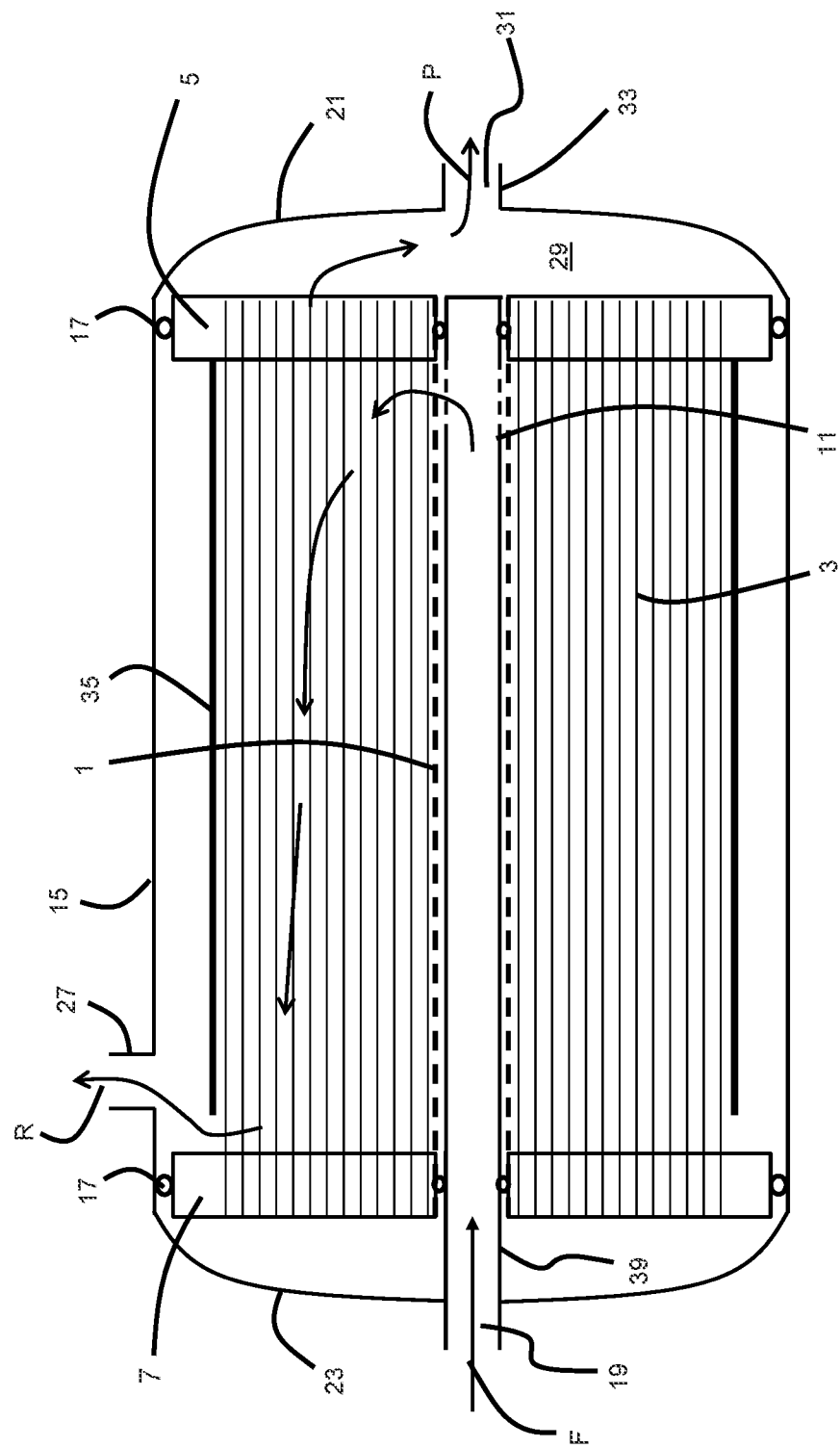
FIG. 8B is a schematic view of another embodiment of the inventive module.

As seen in FIG. 8B, a single-ended, radially outward, shell-fed, hollow fiber membrane module with a counter-flow configuration may be manufactured as follows. A film or fabric 35 is wrapped around a portion of the circumference of the hollow fiber membrane bundle of FIG. 2A or 2C. It is contiguous with the tubesheet 5 to leave a gap in between the tubesheet 5 and an end of the film or fabric 35. The film or fabric-wrapped hollow fiber membrane bundle is disposed concentrically within the pressure vessel 15. The film or fabric-wrapped hollow fiber membrane bundle is concentrically disposed within a pressure vessel 15.

Seals 17 are disposed at interfaces where an outer circumferential surface of the tubesheet 5 is in contact with an inner surface of the pressure vessel 15 and where an outer circumferential surface of the nub 7 is in contact with an inner surface of the pressure vessel 15. This forms a gas-tight seal between the tubesheet 5 and the pressure vessel 15 and between the nub 7 and the pressure vessel 15. The collection tube 11 utilized in this embodiment is that of FIGS. 4A, 4B. The orifices are disposed at positions adjacent the nub 7, at positions adjacent the tubesheet 5, and at positions between the nub 7 and tubesheet 5. Typically, they are formed uniformly across the collection tube 11.

A first end cap 21 and a second end cap 23 are secured, at the second and first ends of the bundle, to opposite ends of the pressure vessel 15 in a gas-tight manner. It should be noted that the bundle illustrated in FIG. 8A is oriented in a direction reverse of that shown in FIGS. 2A, 2C. A feed gas port 19 is formed in the second end cap 23. The first end of the collection tube 11 is in gas-tight fluid communication with the feed gas port 19 via a feed gas inlet tube 39. The second end of the collection tube 11 is blocked to form a gas-tight seal between the collection tube 11 and a space 29 adjacent the first end cap 21. The open bores of the hollow fiber membranes 3 are in fluid communication with a permeate port 31 that is formed in the first end cap 21 (or optionally in the pressure vessel 15 at a position between the tubesheet 5 and the first end cap 21).

In operation, a flow of feed gas F enters the module via the feed gas port 19 and feed gas inlet tube 39. It flows through orifices in the collection tube that are disposed adjacent to tubesheet 5 and enters the bundle. The permeate enters the bores of the membranes 3 and a flow of permeate P is withdrawn from the module via the permeate port 31 and permeate outlet tube 33. The retentate flows over the membranes 3, past the porous support tube 1 and through the gap between the film or fabric 35 and the tubesheet 5. A flow of retentate R is withdrawn from the module via the retentate port 27. The flow pattern in FIG. 8B is considered counter-flow because the flow of feed across the bundle is generally opposite the direction of the flow of permeate through the bores of the membranes 3.

Figure 9A:
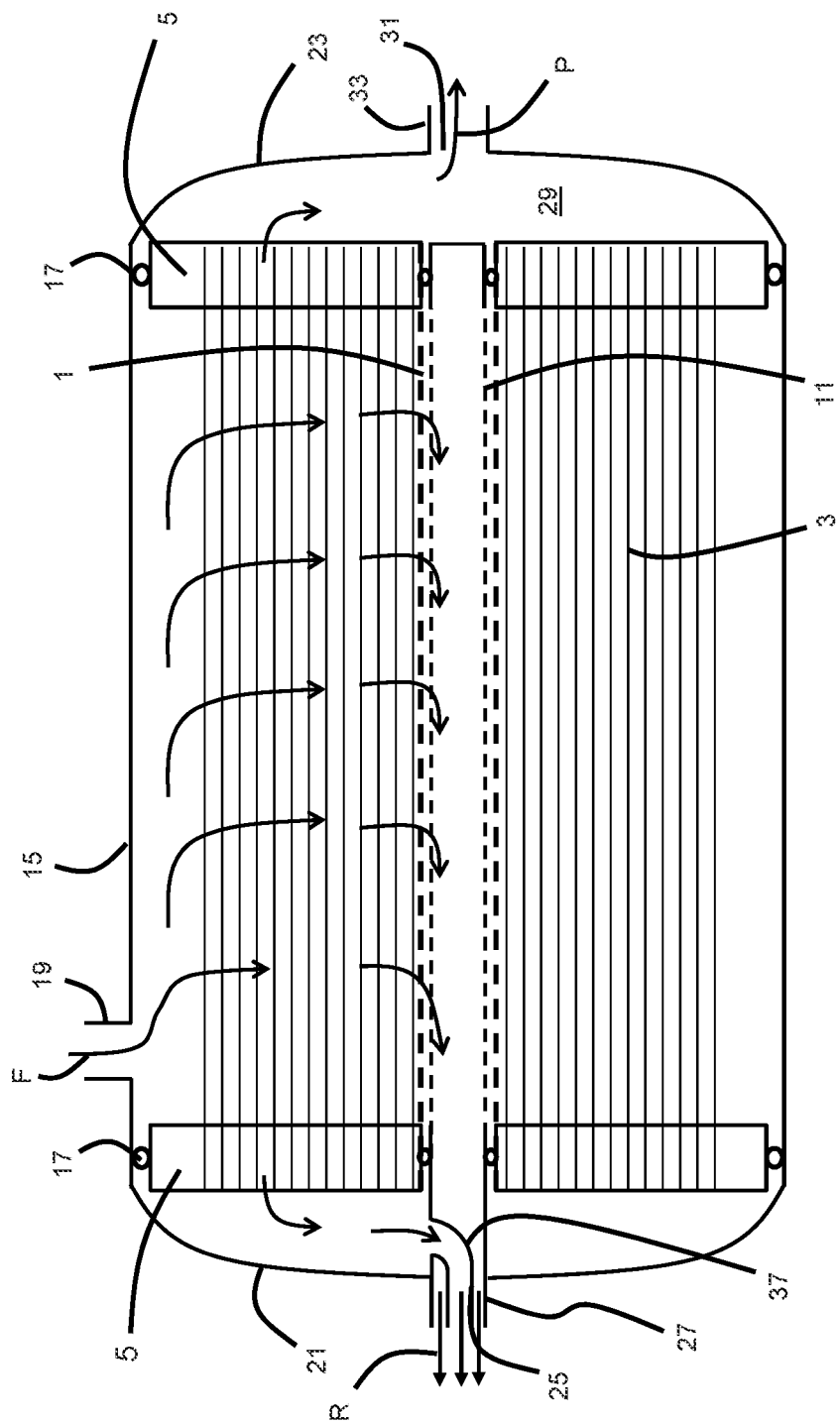
FIG. 9A is a schematic view of another embodiment of the inventive module.

As seen in FIGS. 9A, 9B, a double-ended, radially inward, shell-fed, hollow fiber membrane module with a cross-flow configuration may be manufactured as follows. The hollow fiber membrane bundle of FIG. 2B is disposed concentrically within a pressure vessel 15. Seals 17 are disposed at interfaces where outer circumferential surfaces of the tubesheet 5 are in contact with an inner surface of the pressure vessel 15. This forms gas-tight seals between the tubesheets 5 and the pressure vessel 15. The collection tube 11 utilized in this embodiment is that of FIGS. 3A, 3B. The orifices are disposed at positions adjacent the nub 7, at positions adjacent the tubesheet 5, and at positions between the nub 7 and tubesheet 5. Typically, they are formed uniformly across the collection tube 11.

A feed gas port 19 is formed in the pressure vessel 15 in between the tubesheets 5. A first end cap 21 and a second end cap 23 are secured, at the second and first ends of the bundle, to opposite ends of the pressure vessel 15 in a gas-tight manner. The first end of the collection tube 11 is in gas-tight fluid communication with a residue port 25 that is formed in the second end cap via a residue outlet tube 27. A first end of the residue outlet tube 27 is attached to the first end of the collection tube 11 adjacent the first end of the bundle and a second end of the residue outlet tube 27 extends out of the residue port 25. The second end of the collection tube 11 is blocked to form a gas-tight seal between the collection tube 11 and a space 29 adjacent the first end cap 21. The open bores of the hollow fiber membranes 3 are in fluid communication with a permeate outlet tube 37 that extends into and along a bore of the residue outlet tube 27 and out the residue port 25. The permeate outlet tube 37 is sealed from the collection tube 11 and the residue outlet tube 27 so as to prevent residue from leaking into permeate outlet tube 37. Alternatively and as shown in FIG. 17, the open bores of the hollow fiber membranes 3 are in fluid communication with a permeate port 39 formed in the first end cap or in the pressure vessel at a position between the tubesheet and the second end cap.

In operation, a flow of feed gas F enters the module via the feed gas port 19 and contacts the membranes 3. Permeate enters the bores of the membranes 3 and a flow of permeate P is withdrawn from the module in one of two ways. As seen in FIG. 9A, permeate exiting the bores on the first end of the bundle enters into the permeate outlet tube 37. Also, permeate exiting the bores on the second end of the bundle exits the bundle via a permeate port 31 and permeate outlet tube 33. Alternatively, and as seen in FIG. 9B, permeate exiting the bores on the second end of the bundle exits the bundle also via the permeate outlet tube 37. As seen therein, the permeate outlet tube has two openings for entry of the permeate The retentate flows over the membranes 3, past the porous support tube 1 and through orifices in the collection tube 11. A flow of retentate R flows past the orifices in the collection tube and is withdrawn from the module via the retentate port 27 and retentate outlet tube 27. The flow pattern in FIGS. 9A, 9B is considered cross-flow because the flow of feed across the bundle is generally perpendicular to the direction of the flow of permeate through the bores of the membranes 3.

Figure 9C:
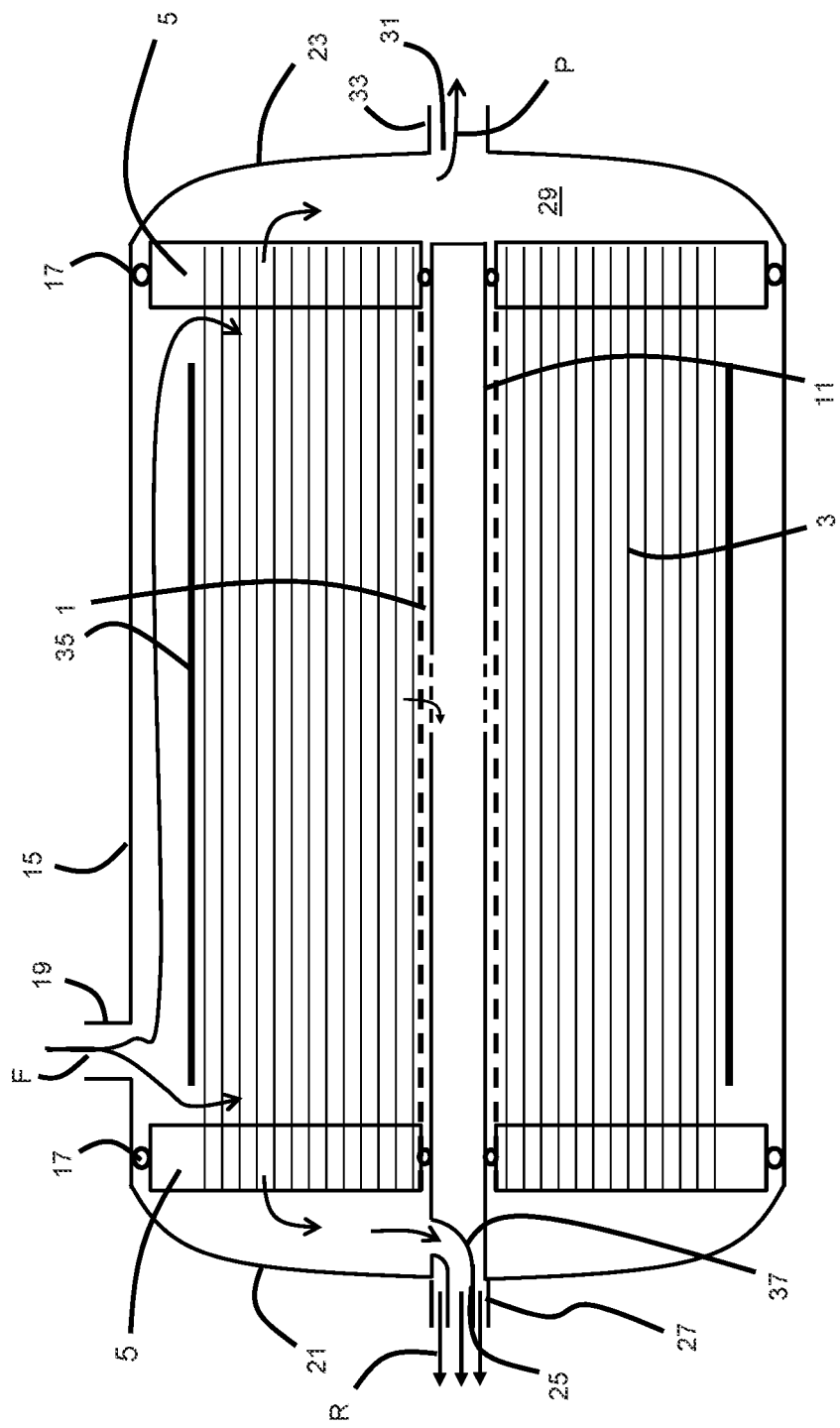
FIG. 9C is a schematic view of another embodiment of the inventive module.

As seen in FIGS. 9C, 9BD, a double-ended, radially inward, shell-fed, hollow fiber membrane module with a counter-flow configuration may be manufactured as follows. A film or fabric 35 is wrapped around a portion of the circumference of the hollow fiber membrane bundle of FIG. 2B leaving gaps between ends of the film or fabric 35 and the tubesheets 5. The film or fabric-wrapped hollow fiber membrane bundle is disposed concentrically within the pressure vessel 15. The film or fabric-wrapped hollow fiber membrane bundle is concentrically disposed within a pressure vessel 15. Seals 17 are disposed at interfaces where outer circumferential surfaces of the tubesheet 5 are in contact with an inner surface of the pressure vessel 15. This forms gas-tight seals between the tubesheets 5 and the pressure vessel 15. The collection tube 11 utilized in this embodiment is that of FIGS. 5A, 5B. The orifices are disposed only at a middle portion of the collection tube 11 or adjacent to the middle portion.

A feed gas port 19 is formed in the pressure vessel 15 in between the tubesheets 5. A first end cap 21 and a second end cap 23 are secured, at the second and first ends of the bundle, to opposite ends of the pressure vessel 15 in a gas-tight manner. The first end of the collection tube 11 is in gas-tight fluid communication with a residue port 25 that is formed in the second end cap via a residue outlet tube 27. A first end of the residue outlet tube 27 is attached to the first end of the collection tube 11 adjacent the first end of the bundle and a second end of the residue outlet tube 27 extends out of the residue port 25. The second end of the collection tube 11 is blocked to form a gas-tight seal between the collection tube 11 and a space 29 adjacent the first end cap 21. The open bores of the hollow fiber membranes 3 are in fluid communication with a permeate outlet tube 37 that extends into and along a bore of the residue outlet tube 27 and out the residue port 25. The permeate outlet tube 37 is sealed from the collection tube 11 and the residue outlet tube 27 so as to prevent residue from leaking into permeate outlet tube 37. Alternatively and as shown in FIG. 17, the open bores of the hollow fiber membranes 3 are in fluid communication with a permeate port 39 formed in the first end cap or in the pressure vessel at a position between the tubesheet and the second end cap.

In operation, a flow of feed gas F enters the module via the feed gas port 19 and contacts the membranes 3. Permeate enters the bores of the membranes 3 and a flow of permeate P is withdrawn from the module in one of two ways. As seen in FIG. 9C, permeate exiting the bores on the first end of the bundle enters into the permeate outlet tube 37. Also, permeate exiting the bores on the second end of the bundle exits the bundle via a permeate port 31 and permeate outlet tube 33. Alternatively, and as seen in FIG. 9D, permeate exiting the bores on the second end of the bundle exits the bundle also via the permeate outlet tube 37. As seen therein, the permeate outlet tube has two openings for entry of the permeate. The residue flows over the membranes 3, past the porous support tube 1 and through orifices in the collection tube 11. A flow of retentate R flows past the orifices in the collection tube and is withdrawn from the module via the retentate port 27 and retentate outlet tube 27. The flow pattern in FIGS. 9C, 9D is considered counter-flow because the flow of feed across the bundle is generally opposite to the direction of the flow of permeate through the bores of the membranes 3.

Figure 10B:
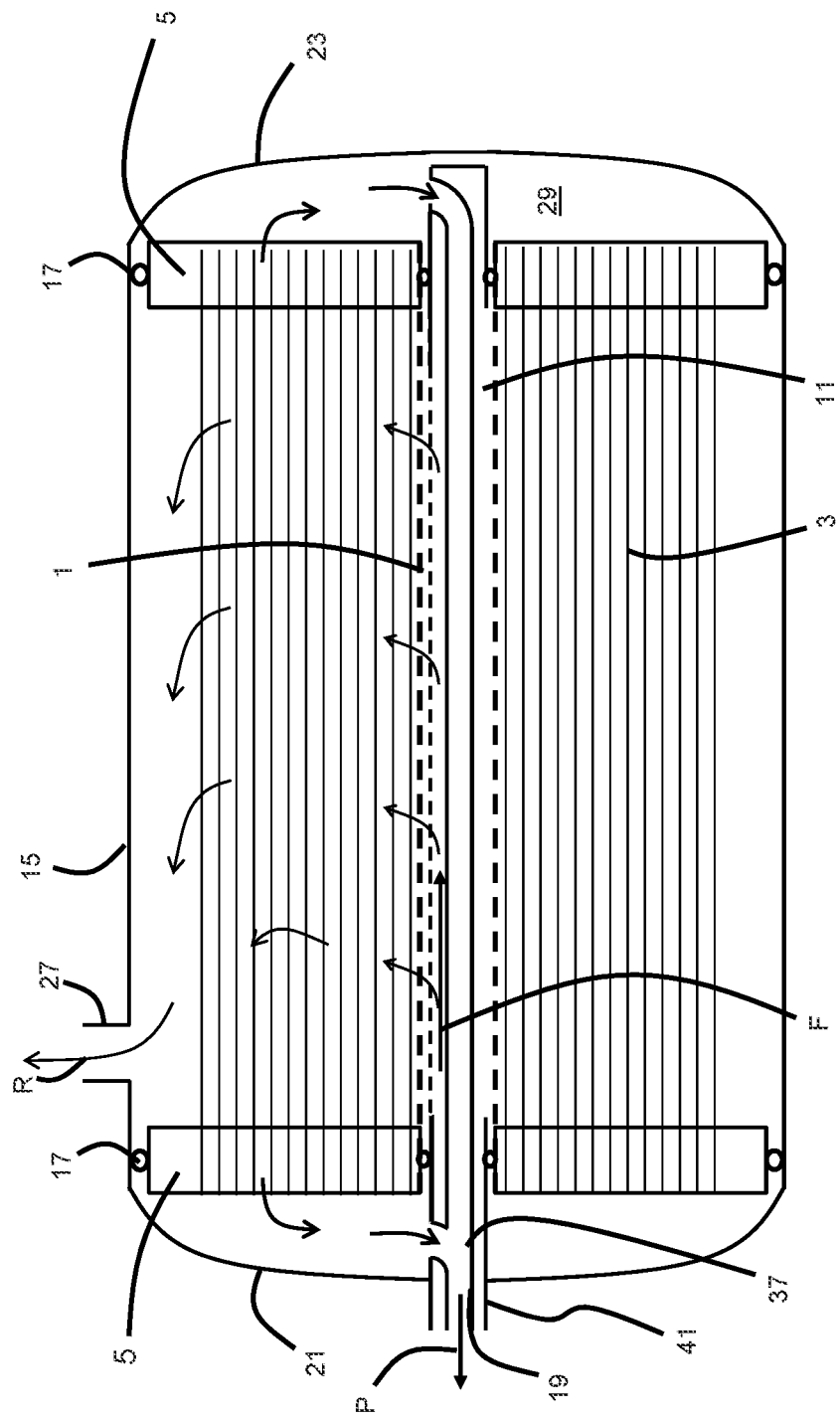
FIG. 10B is a schematic view of another embodiment of the inventive module.

As seen in FIGS. 10A, 10B, a double-ended, radially outward, shell-fed, hollow fiber membrane module with a cross-flow configuration may be manufactured as follows. The hollow fiber membrane bundle of FIG. 2B is disposed concentrically within a pressure vessel 15. Seals 17 are disposed at interfaces where outer circumferential surfaces of the tubesheet 5 are in contact with an inner surface of the pressure vessel 15. This forms gas-tight seals between the tubesheets 5 and the pressure vessel 15. The collection tube 11 utilized in this embodiment is that of FIGS. 3A, 3B. The orifices are disposed at positions adjacent the nub 7, at positions adjacent the tubesheet 5, and at positions between the nub 7 and tubesheet 5. Typically, they are formed uniformly across the collection tube 11.

A first end cap 21 and a second end cap 23 are secured, at the second and first ends of the bundle, to opposite ends of the pressure vessel 15 in a gas-tight manner. A feed gas port 19 is formed in the first end cap 21. The first end of the collection tube 11 is in gas-tight fluid communication with the feed gas port 19 feed gas inlet tube 41. A first end of the feed gas inlet tube 41 is attached to the first end of the collection tube 11 adjacent the first end of the bundle and a second end of the feed gas inlet tube 41 extends out of the feed gas port 19. The second end of the collection tube 11 is blocked to form a gas-tight seal between the collection tube 11 and a space 29 adjacent the first end cap 21. The open bores of the hollow fiber membranes 3 adjacent the first end of the bundle are in fluid communication with a permeate outlet tube 37 that extends into and along a bore of the feed gas inlet tube 41 and out the feed gas port 19. The permeate outlet tube 37 is sealed from the collection tube 11 and the feed gas inlet tube 41 so as to prevent feed gas from leaking into permeate outlet tube 37. As shown in FIG. 10A, the open bores of the hollow fiber membranes 3 adjacent the second end of the bundle are in fluid communication with a permeate port 31 and permeate outlet tube 33. Alternatively, and as seen in FIG. 9D, permeate exiting the bores on the second end of the bundle exits the bundle also via the permeate outlet tube 37. As seen therein, the permeate outlet tube has two openings for entry of the permeate.

In operation, a flow of feed gas F enters the module via the feed gas port 19, passed through orifices in the collection tube and enters the bundle where it contacts the membranes 3. Permeate enters the bores of the membranes 3 and a flow of permeate P is withdrawn from the module in one of two ways. As seen in FIG. 10A, permeate exiting the bores on the first end of the bundle enters into the permeate outlet tube 37. Also, permeate exiting the bores on the second end of the bundle exits the bundle via a permeate port 31 and permeate outlet tube 33. Alternatively, and as seen in FIG. 10B, permeate exiting the bores on the second end of the bundle exits the bundle also via the permeate outlet tube 37. As seen therein, the permeate outlet tube has two openings for entry of the permeate The retentate flows over the membranes 3, past the porous support tube 1 and through orifices in the collection tube 11. A flow of retentate R flows past the orifices in the collection tube and is withdrawn from the module via the retentate port 27 and retentate outlet tube 27. The flow pattern in FIGS. 9A, 9B is considered cross-flow because the flow of feed across the bundle is generally perpendicular to the direction of the flow of permeate through the bores of the membranes 3.

Figure 10D:
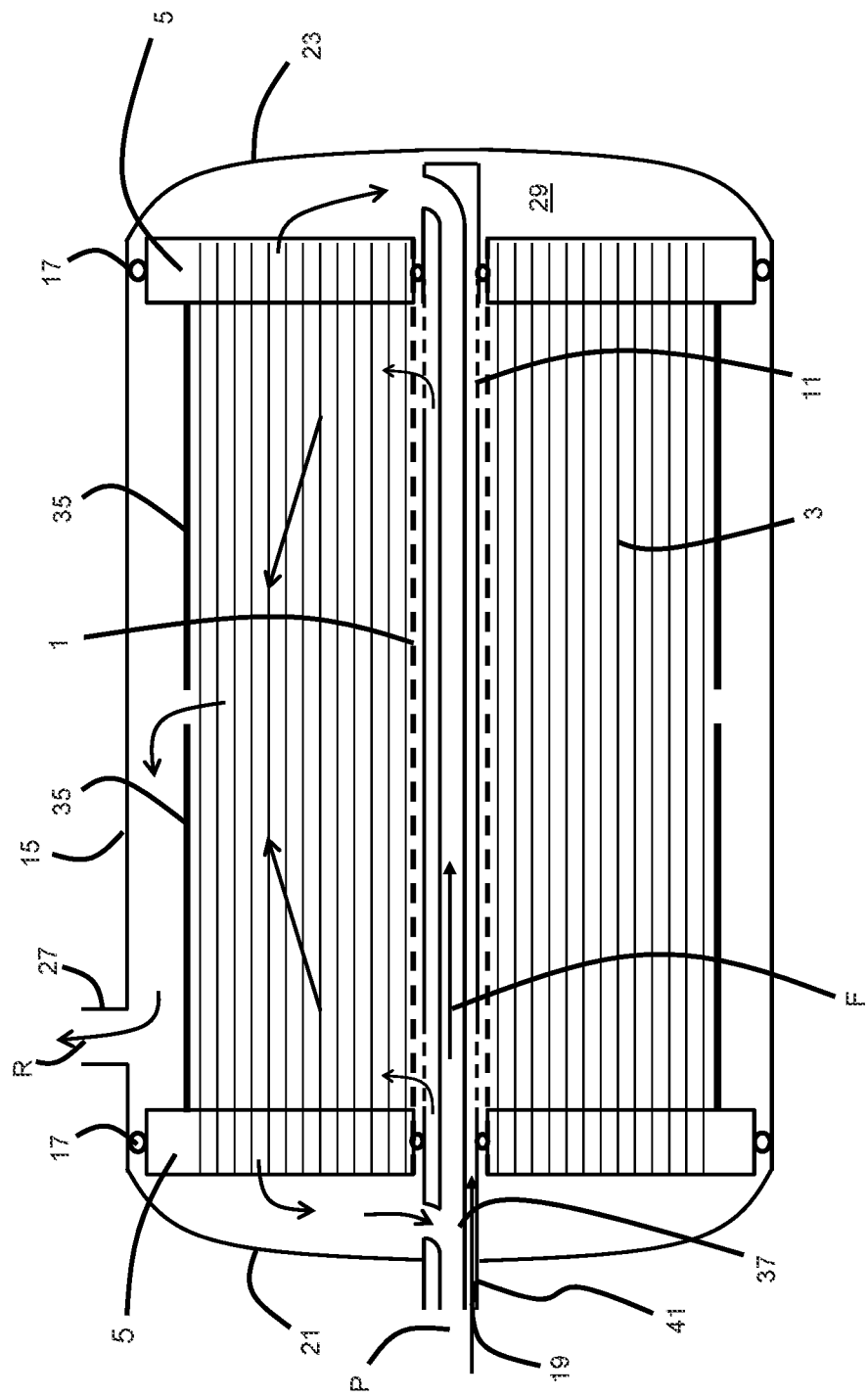
FIG. 10D is a schematic view of another embodiment of the inventive module.

As seen in FIGS. 10C, 10D, a double-ended, radially outward, shell-fed, hollow fiber membrane module with a counter-flow configuration may be manufactured as follows. Two films or fabrics 35 are wrapped around a portion of the circumference of the hollow fiber membrane bundle of FIG. 2B wherein each film or fabric 35 is adjacent to and secured to an associated one of the tubesheets 35, however, a gap is left between the two films or fabrics 35 in the middle of the wrapped bundle. The film or fabric-wrapped hollow fiber membrane bundle is disposed concentrically within the pressure vessel 15. Seals 17 are disposed at interfaces where outer circumferential surfaces of the tubesheet 5 are in contact with an inner surface of the pressure vessel 15. This forms gas-tight seals between the tubesheets 5 and the pressure vessel 15. The collection tube 11 utilized in this embodiment is that of FIGS. 6A, 6B. The orifices are disposed only at positions adjacent the tubesheets 5.

A first end cap 21 and a second end cap 23 are secured, at the second and first ends of the bundle, to opposite ends of the pressure vessel 15 in a gas-tight manner. A feed gas port 19 is formed in the first end cap 21. The first end of the collection tube 11 is in gas-tight fluid communication with the feed gas port 19 feed gas inlet tube 41. A first end of the feed gas inlet tube 41 is attached to the first end of the collection tube 11 adjacent the first end of the bundle and a second end of the feed gas inlet tube 41 extends out of the feed gas port 19. The second end of the collection tube 11 is blocked to form a gas-tight seal between the collection tube 11 and a space 29 adjacent the first end cap 21. The open bores of the hollow fiber membranes 3 adjacent the first end of the bundle are in fluid communication with a permeate outlet tube 37 that extends into and along a bore of the feed gas inlet tube 41 and out the feed gas port 19. The permeate outlet tube 37 is sealed from the collection tube 11 and the feed gas inlet tube 41 so as to prevent feed gas from leaking into permeate outlet tube 37. As shown in FIG. 10A, the open bores of the hollow fiber membranes 3 adjacent the second end of the bundle are in fluid communication with a permeate port 31 and permeate outlet tube 33. Alternatively, and as seen in FIG. 9D, permeate exiting the bores on the second end of the bundle exits the bundle also via the permeate outlet tube 37. As seen therein, the permeate outlet tube has two openings for entry of the permeate.

In operation, a flow of feed gas F enters the module via the feed gas port 19, passed through orifices in the collection tube 11 at positions adjacent the tubesheets 5 and enters the bundle where it contacts the membranes 3. Permeate enters the bores of the membranes 3 and a flow of permeate P is withdrawn from the module in one of two ways. As seen in FIG. 10C, permeate exiting the bores on the first end of the bundle enters into the permeate outlet tube 37. Also, permeate exiting the bores on the second end of the bundle exits the bundle via a permeate port 31 and permeate outlet tube 33. Alternatively, and as seen in FIG. 10D, permeate exiting the bores on the second end of the bundle exits the bundle also via the permeate outlet tube 37. As seen therein, the permeate outlet tube has two openings for entry of the permeate The retentate flows over the membranes 3, past the porous support tube 1 and through orifices in the collection tube 11. A flow of retentate R flows towards the center from the sides of the bundle and out the gap between the two films or fabrics 35 where it is withdrawn from the module via the retentate port 27 and retentate outlet tube 27. The flow pattern in FIGS. 10C, 10D is considered counter-flow because the flow of feed across the bundle is generally opposite of the direction of the flow of permeate through the bores of the membranes 3.

Figure 11A:
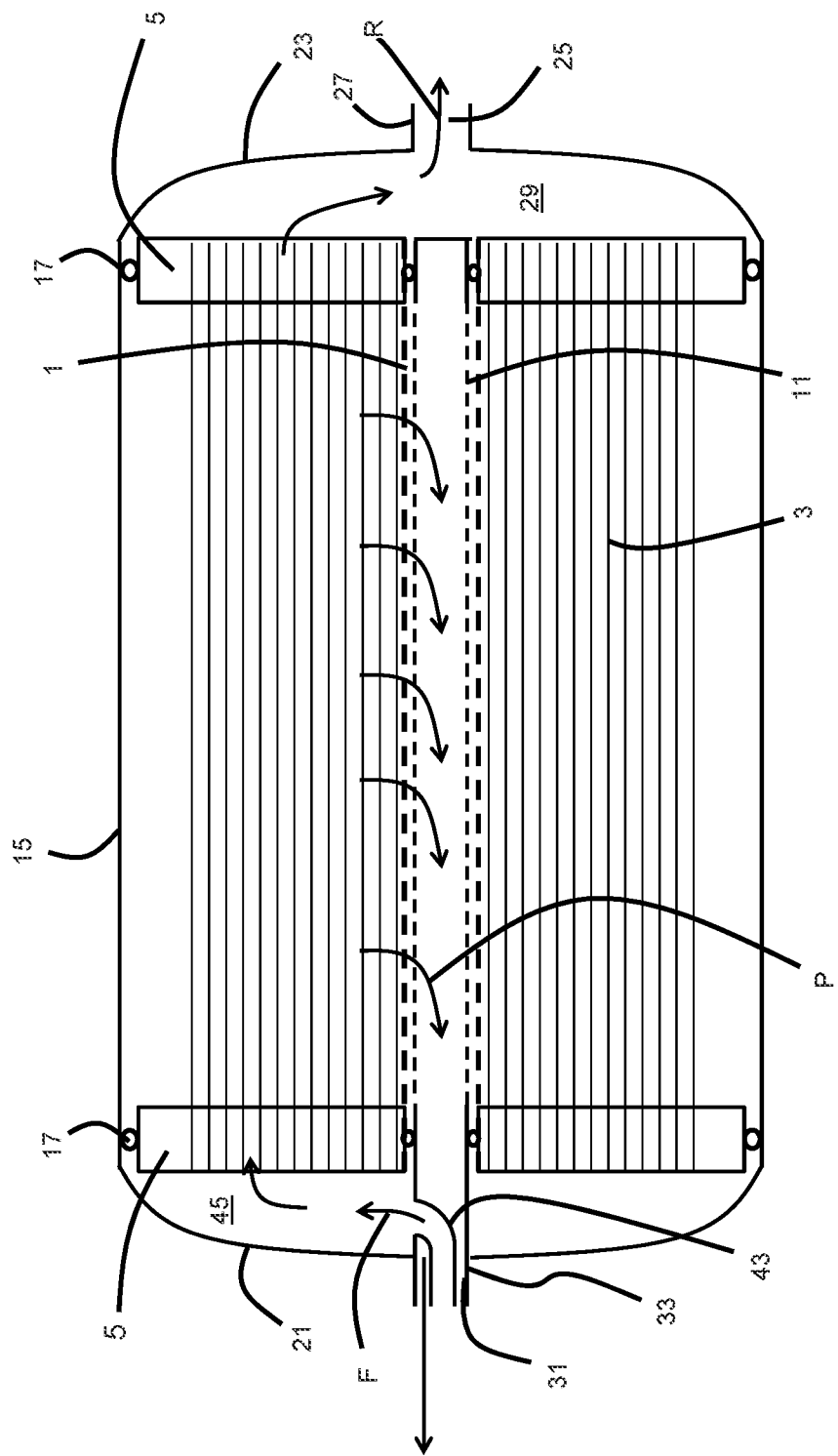
FIG. 11A is a schematic view of another embodiment of the inventive module.

As seen in FIGS. 11A, a radially inward, bore-fed, hollow fiber membrane module with a cross-flow configuration may be manufactured as follows. The hollow fiber membrane bundle of FIG. 2B is disposed concentrically within a pressure vessel 15. Seals 17 are disposed at interfaces where outer circumferential surfaces of the tubesheet 5 are in contact with an inner surface of the pressure vessel 15. This forms gas-tight seals between the tubesheets 5 and the pressure vessel 15. The collection tube 11 utilized in this embodiment is that of FIGS. 3A, 3B. The orifices are disposed at positions adjacent the nub 7, at positions adjacent the tubesheet 5, and at positions between the nub 7 and tubesheet 5. Typically, they are formed uniformly across the collection tube 11.

A first end cap 21 and a second end cap 23 are secured, at the second and first ends of the bundle, to opposite ends of the pressure vessel 15 in a gas-tight manner. A permeate port 31 is formed in the first end cap 21. The first end of the collection tube 11 is connected to a permeate outlet tube 33 that extends through the permeate port 31. Thus, the first end of the collection tube 11 is in gas-tight fluid communication with the permeate outlet tube 33. A feed gas inlet tube 47 extends through and out of the permeate inlet tube 3 and is sealed from the permeate inlet tube 33 to prevent leaking of feed gas into the permeate inlet tube 3. The second end of the collection tube 11 is blocked to form a gas-tight seal between the collection tube 11 and a space 29 adjacent the first end cap 21. The feed gas inlet tube 47 emerges out of an opening in the permeate gas inlet tube 33 and into the space adjacent the first end cap 21 to allow the feed gas to fed into the open bores of the membranes. Thus, the open bores of the hollow fiber membranes 3 adjacent the first end of the bundle are in fluid communication with the feed gas inlet tube 47. The open bores of the membranes 3 adjacent the second end of the bundle are in fluid communication with the space 29 adjacent the second end cap and the permeate gas port 31 and permeate gas outlet tube 33.

In operation, a flow of feed gas F enters the module via the feed gas inlet tube 47 and into the open bores of the membranes adjacent the first end of the bundle via space 45. The permeate passes through the walls of the membranes 3 and a flow of permeate P passes through the orifices of the collection tube 11 and flows out of the collection tube 11 and into the permeate outlet tube 33 where it is withdrawn from the module. The residue flows out of the open ends of the bores adjacent the second end of the bundle and is withdrawn from module via a residue outlet tube 27 and residue port 25 formed in the second end cap 23. on the first end of the bundle enters into the permeate outlet tube 37. The retentate flows through the bores of the membranes 3 and exits the open ends of the bores adjacent the second end of the bundle where it is withdrawn from the module via the retentate outlet tube 27. The flow pattern in FIG. 11A is considered cross-flow because the flow of feed across the bundle is generally perpendicular to the direction of the flow of permeate through the bores of the membranes 3.

As seen in FIG. 11B, a radially inward, bore-fed, hollow fiber membrane module with a counter-flow configuration may be manufactured as follows. A film or fabrics 35 are wrapped around a portion of the circumference of the hollow fiber membrane bundle of FIG. 2B in between and connected to the tubesheets 35, leaving no gap between the film or fabric 35 and the tubesheets 5. Seals 17 are disposed at interfaces where outer circumferential surfaces of the tubesheet 5 are in contact with an inner surface of the pressure vessel 15. This forms gas-tight seals between the tubesheets 5 and the pressure vessel 15. The collection tube 11 utilized in this embodiment is that of FIG. 4A, 4B. The orifices are disposed only at positions adjacent the tubesheet 5 that is adjacent the first end of the bundle.

A first end cap 21 and a second end cap 23 are secured, at the second and first ends of the bundle, to opposite ends of the pressure vessel 15 in a gas-tight manner. A permeate port 31 is formed in the first end cap 21. The first end of the collection tube 11 is connected to a permeate outlet tube 33 that extends through the permeate port 31. Thus, the first end of the collection tube 11 is in gas-tight fluid communication with the permeate outlet tube 33. A feed gas inlet tube 47 extends through and out of the permeate inlet tube 3 and is sealed from the permeate inlet tube 33 to prevent leaking of feed gas into the permeate inlet tube 3. The second end of the collection tube 11 is blocked to form a gas-tight seal between the collection tube 11 and a space 29 adjacent the first end cap 21. The feed gas inlet tube 47 emerges out of an opening in the permeate gas inlet tube 33 and into the space adjacent the first end cap 21 to allow the feed gas to fed into the open bores of the membranes. Thus, the open bores of the hollow fiber membranes 3 adjacent the first end of the bundle are in fluid communication with the feed gas inlet tube 47. The open bores of the membranes 3 adjacent the second end of the bundle are in fluid communication with the space 29 adjacent the second end cap and the permeate gas port 31 and permeate gas outlet tube 33.

In operation, a flow of feed gas F enters the module via the feed gas inlet tube 47 and into the open bores of the membranes adjacent the first end of the bundle via space 45. The permeate passes through the walls of the membranes 3 and a flow of permeate P passes through the orifices of the collection tube 11 (again only disposed adjacent to the tubesheet 5 that is adjacent the first end of the bundle) and flows out of the collection tube 11 and into the permeate outlet tube 33 where it is withdrawn from the module. The residue flows out of the open ends of the bores adjacent the second end of the bundle and is withdrawn from module via a residue outlet tube 27 and residue port 25 formed in the second end cap 23. on the first end of the bundle enters into the permeate outlet tube 37. The retentate flows through the bores of the membranes 3 and exits the open ends of the bores adjacent the second end of the bundle where it is withdrawn from the module via the retentate outlet tube 27. The flow pattern in FIG. 11A is considered counter-flow because the flow of feed across the bundle is generally opposite the direction of the flow of permeate through the bores of the membranes 3.

Figure 12A:
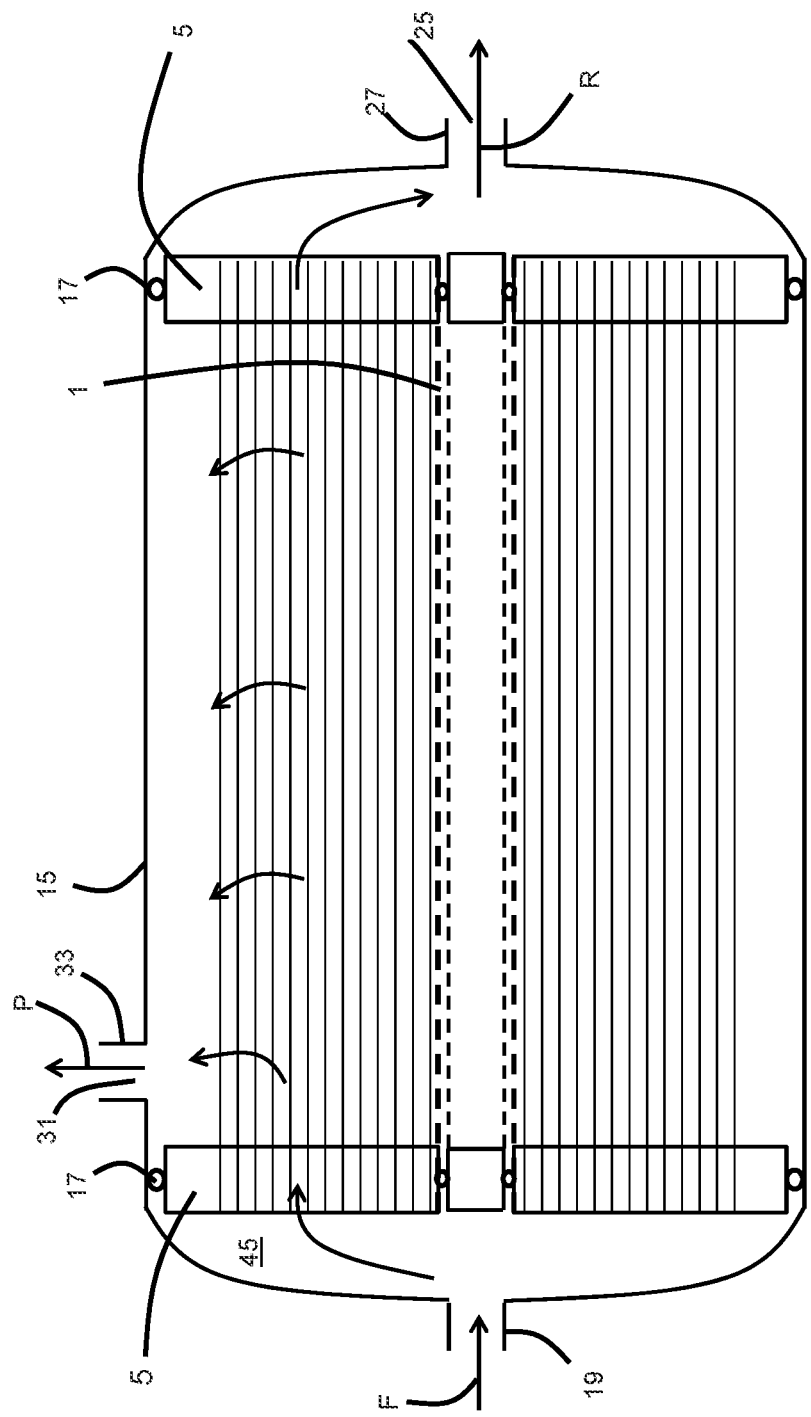
FIG. 12A is a schematic view of another embodiment of the inventive module.

As seen in FIG. 12A, a radially outward, bore-fed, hollow fiber membrane module with a cross-flow configuration may be manufactured as follows. The hollow fiber membrane bundle of FIG. 2B is disposed concentrically within a pressure vessel 15. Seals 17 are disposed at interfaces where outer circumferential surfaces of the tubesheet 5 are in contact with an inner surface of the pressure vessel 15. This forms gas-tight seals between the tubesheets 5 and the pressure vessel 15. The collection tube 11 utilized in this embodiment is that of FIGS. 3A, 3B. The orifices are disposed at positions adjacent the nub 7, at positions adjacent the tubesheet 5, and at positions between the nub 7 and tubesheet 5. Typically, they are formed uniformly across the collection tube 11.

A first end cap 21 and a second end cap 23 are secured, at the second and first ends of the bundle, to opposite ends of the pressure vessel 15 in a gas-tight manner. A feed gas port 19 is formed in the first end cap 21. Each of the ends of the collection tube 11 are blocked to prevent feed gas from leaking into space occupied by the lower pressure permeate gas. The open bores of the hollow fiber membranes 3 adjacent the first end of the bundle are in fluid communication with the feed gas port 19 via space 45. The open bores of the membranes 3 adjacent the second end of the bundle are in fluid communication with the permeate gas port 31 and permeate gas outlet tube 33 via space 29.

In operation, a flow of feed gas F enters the module via the feed gas port 19 and into the open bores of the membranes adjacent the first end of the bundle via space 45. The permeate passes through the walls of the membranes 3 and a flow of permeate P is withdrawn from the module via permeate port 31 and permeate outlet tube 3. The residue flows out of the open ends of the bores adjacent the second end of the bundle and is withdrawn from module via a residue outlet tube 27 and residue port 25 formed in the second end cap 23. on the first end of the bundle enters into the permeate outlet tube 37. The retentate flows through the bores of the membranes 3 and exits the open ends of the bores adjacent the second end of the bundle where it is withdrawn from the module via the retentate outlet tube 27. The flow pattern in FIG. 12A is considered cross-flow because the flow of feed across the bundle is generally perpendicular to the direction of the flow of permeate through the bores of the membranes 3.

Figure 12B:
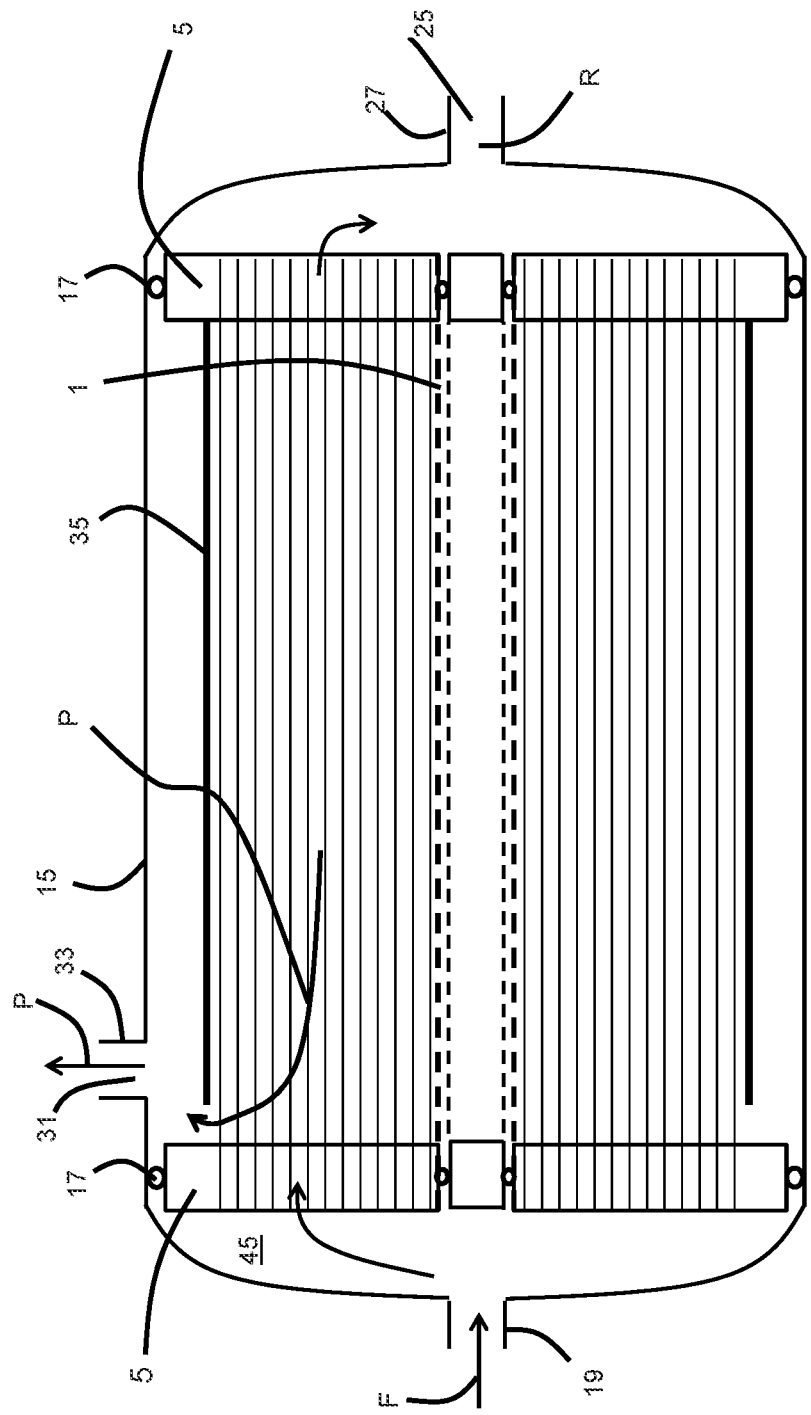
FIG. 12B is a schematic view of another embodiment of the inventive module.

As seen in FIG. 12B, a radially outward, bore-fed, hollow fiber membrane module with a counter-flow configuration may be manufactured as follows. A film or fabric 35 is wrapped around a portion of the circumference of the hollow fiber membrane bundle of FIG. 2B contiguous with and connected to the tubesheet 5 adjacent the second end of the bundle, but leaving a gap in between the end of the film or fabric 35 and the tubesheet 5 adjacent the first end of the bundle. The film or fabric-wrapped hollow fiber membrane bundle is disposed concentrically within the pressure vessel 15. Seals 17 are disposed at interfaces where outer circumferential surfaces of the tubesheet 5 are in contact with an inner surface of the pressure vessel 15. This forms gas-tight seals between the tubesheets 5 and the pressure vessel 15. The collection tube 11 utilized in this embodiment is that of FIGS. 3A, 3B. The orifices are disposed at positions adjacent the nub 7, at positions adjacent the tubesheet 5, and at positions between the nub 7 and tubesheet 5. Typically, they are formed uniformly across the collection tube 11.

A first end cap 21 and a second end cap 23 are secured, at the second and first ends of the bundle, to opposite ends of the pressure vessel 15 in a gas-tight manner. A feed gas port 19 is formed in the first end cap 21. Each of the ends of the collection tube 11 are blocked to prevent feed gas from leaking into space occupied by the lower pressure permeate gas. The open bores of the hollow fiber membranes 3 adjacent the first end of the bundle are in fluid communication with the feed gas port 19 via space 45. The open bores of the membranes 3 adjacent the second end of the bundle are in fluid communication with the permeate gas port 31 and permeate gas outlet tube 33 via space 29.

In operation, a flow of feed gas F enters the module via the feed gas port 19 and into the open bores of the membranes adjacent the first end of the bundle via space 45. A flow of the permeate P passes through the walls of the membranes 3, passes through the gap between the film or fabric 35 and the tubesheet 5 adjacent the first end of the bundle and is withdrawn from the module via permeate port 31 and permeate outlet tube 3. The residue flows out of the open ends of the bores adjacent the second end of the bundle and is withdrawn from module via a residue outlet tube 27 and residue port 25 formed in the second end cap 23. on the first end of the bundle enters into the permeate outlet tube 37. The retentate flows through the bores of the membranes 3 and exits the open ends of the bores adjacent the second end of the bundle where it is withdrawn from the module via the retentate outlet tube 27. The flow pattern in FIG. 12B is considered counter-flow because the flow of feed across the bundle is generally opposite the direction of the flow of permeate through the bores of the membranes 3.

EXAMPLES

Example 1 is directed to the conversion of a module from cross-flow to hybrid cross-flow+countercurrent flow configuration. This example describes the conversion via the disclosed method and testing of two modules in (i) cross-flow, (ii) hybrid cross-flow+countercurrent flow, (iii) full countercurrent flow modes. The modules were tested in each configuration with 10% $CO_2$ in $N_2$ at 100 psig feed pressure, ~99.9 psig residue pressure and 5 psig permeate pressure. The feed flow was controlled so that the residue concentration was 5% $CO_2$.

The modules were converted from the cross-flow mode to a hybrid cross-flow+countercurrent by adding only the exterior impermeable wrap while retaining the same cross-flow collection tube insert as described above. The exterior wrap is added to allow a 3" feed access opening near the open-fiber tube-sheet side of the 40" bundle.

The hybrid modules described above were then converted to full countercurrent flow mode by replacing the radial cross-flow collection tube insert with the countercurrent tube as described in Detailed Description.

Figure 13:
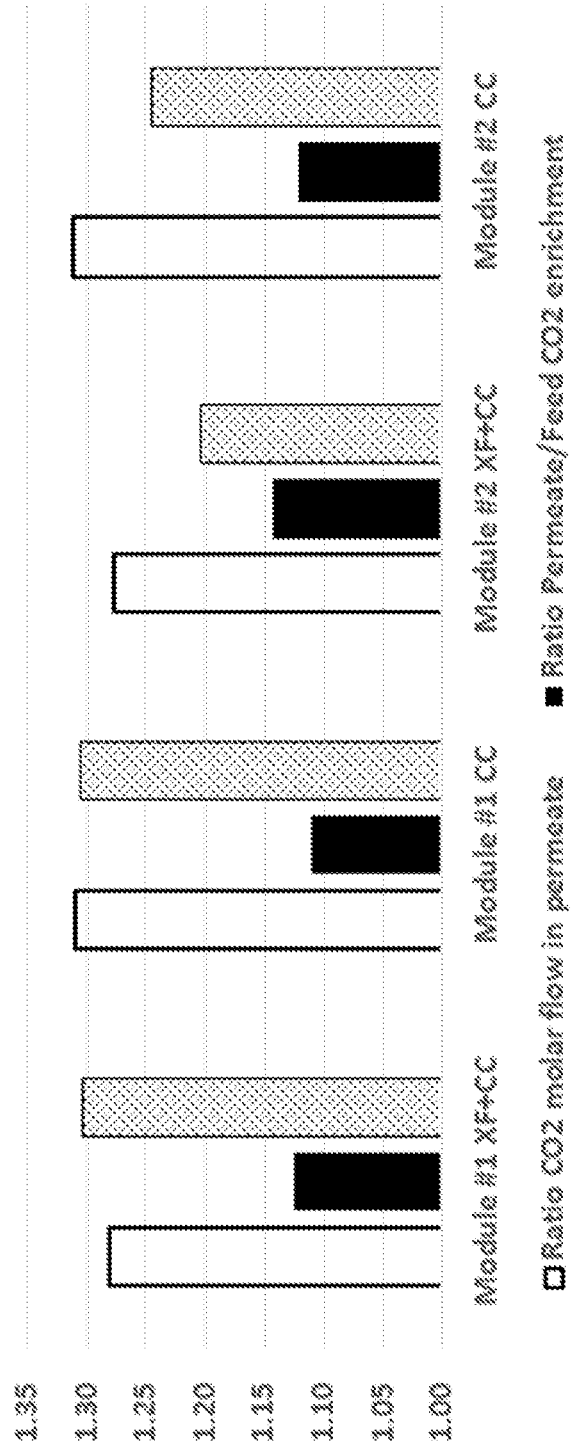
FIG. 13 is a bar chart of experimental data.

Three variables were measured: feed flows, $CO_2$ molar flow in the permeates, and the permeate/feed $CO_2$ enrichment. In order to compare the effects of the hybrid (XF+CC) and fully counter-flow (CC) modes to the cross-flow mode (XF), relative ratios were calculated by dividing each of three variables for the hybrid mode by the corresponding variable for the cross-flow mode and also by dividing each of the three variables for the counter-flow mode by the same corresponding variables for the cross-flow mode. These relative rations are listed in TABLE 1. These values were also plotted in the bar chart of FIG. 13. The significantly enhanced performance of both hybrid and fully countercurrent bundles in this test relative to the original cross-flow configuration can be observed from the table and figure. The hybrid bundle configuration increased the feed flow per bundle by 20-30%, the molar flow of CO2 in the permeate by 28% and the CO2 enrichment factor (permeate/feed purity) increased by 12-14%. The full countercurrent bundle configuration increased the treated feed flow per bundle by 25-30%, the molar flow of CO2 in the permeate by 31% and the CO2 enrichment factor (permeate/feed purity) increased by 11-12%. The results have clearly proven a crossflow bundle can be successfully converted into the hybrid or countercurrent configuration using the method described in Detailed Description.

TABLE 1

|  | Module #1 | | | Module #2 | | |
|---|---|---|---|---|---|---|
|  | \multicolumn{6}{c}{Bundle Configuration} |
|  | XF | XF + CC | CC | XF | XF + CC | CC |
| Ratio Feed flow | 1.00 | 1.30 | 1.30 | 1.00 | 1.20 | 1.25 |
| Ratio CO2 molar flow in permeate | 1.00 | 1.28 | 1.31 | 1.00 | 1.28 | 1.31 |
| Ratio Permeate/Feed CO2 enrichment | 1.00 | 1.12 | 1.11 | 1.00 | 1.14 | 1.12 |

Example 2 is directed to a membrane system for $H_2$/CO ratio adjustment which prefers cross-flow bundles. This example demonstrates the necessity of manufacturing cross-flow configuration bundle since cross-flow has the advantage of a lower pressure drop for $H_2$/CO ratio adjustment application.

Figure 14:
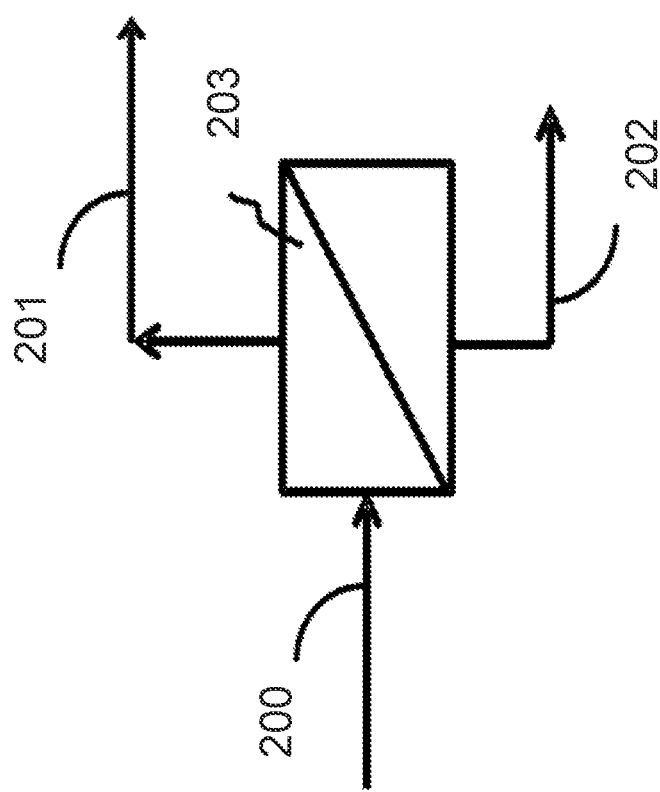
FIG. 14 is a schematic of a one-stage gas purification scheme using the inventive module.

A HYSYS computer simulation was performed to simulate the $H_2$:CO ratio adjustment of a feed gas stream containing 75% $H_2$ and 25% of CO. This feed gas stream is a typical syngas produced from steam methane reformers. It was assumed that the membrane system is designed to have the $H_2$:CO ratio adjusted from 3:1 in the feed to 2:1 in the residue stream. This residue stream will then be sent to a cold box to further purify the $H_2$ before use in chemical reactors. The $H_2$/CO ratio adjustment process was assumed to be carried out according to the conventional membrane separation process design shown in FIG. 14, where 200 is the feed stream, 201 is the residue stream, 202 is the permeate stream and 203 is the membrane unit.

Two simulation cases were done with the same feed composition and feed condition. For both cases, the same base module was assumed in the simulation with the same active membrane area. The only difference is that one case was simulated with cross-flow membrane bundles (XF) and the other was simulated with countercurrent flow membrane bundles (CC). The results of the simulation are shown in TABLE 2.

TABLE 2

| XF | | | |
|---|---|---|---|
| Stream | 200 | 201 | 202 |
| Temperature [C.] | 70 | 70 | 70 |
| Pressure [psig] | 420.4 | 416.1 | 5.0 |
| Molar Flow [Sm³/day*] | 182685 | 136573 | 46112 |
| Component (Mol %) | | | |
| H2 | 0.750 | 0.667 | 0.995 |
| CO | 0.250 | 0.333 | 0.005 |
| Membrane Area [m²] | 323.6 | | |
| CC | | | |
| Stream | 200 | 201 | 202 |
| Temperature [C.] | 70 | 70 | 70 |
| Pressure [psig] | 420.4 | 398.3 | 5 |
| Molar Flow [Sm³/day*] | 175604 | 131061 | 44543 |
| Component (Mol %) | | | |
| H₂ | 0.75 | 0.667 | 0.995 |
| CO | 0.25 | 0.333 | 0.005 |
| Membrane Area [m²] | 323.6 | | |

It can be seen that the crossflow bundle configuration is the desired configuration for $H_2$/CO ratio adjustment application because crossflow bundles can not only process higher flow rate but also lead to lower feed to residue pressure drop. The feed flow processed by cross-flow bundles is 182685 Sm³/day, which is 4% more than the 175604 Sm³/day by countercurrent membrane bundles. This means that less membrane bundles will be required to process the same feed flow using cross-flow bundles, hence lower CAPEX of the membrane system. The feed to residue pressure drop with cross-flow membrane bundles is 4.3 psig, which is much less than 22.1 psig with countercurrent flow bundles. For $H_2$:CO ratio adjustment application, this pressure drop difference is quite significant because the separation efficiency of the cold box decreases as the cold box inlet stream (membrane residue stream) pressure increases.

Example 3 is directed to a membrane system for $CO_2$ reduction with mixed cross-flow and countercurrent flow bundles. This example demonstrates the advantage of a membrane system that has mixed flow configuration bundles.

A HYSYS computer simulation was performed to simulate the treatment of a raw natural gas stream containing about 38% $CO_2$, about 49% $CH_4$, 6% ethane, 4% propane, and about 3% $C_{3+}$ hydrocarbons. This stream is a typical associate gas. It was assumed that the membrane system is designed to treat a feed gas flow of 1644961 Sm³/day and have the $CO_2$ content reduced from about 38% to about 12% after the 1st stage and from about 12% to about 3% after the 2nd stage.

Figure 15:
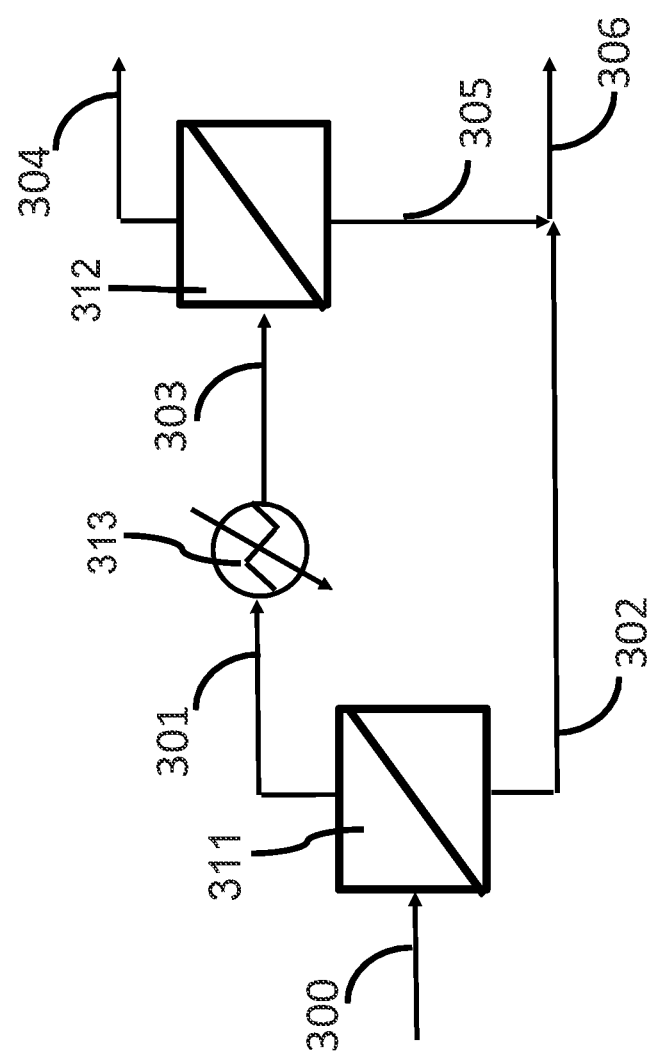
FIG. 15 is a schematic of a two-stage gas purification scheme using the inventive module.

The $CO_2$ removal process was assumed to be carried out according to the two stage membrane separation process design shown in FIG. 15. As shown, a feed gas stream 300 passes through the first stage membrane separation unit 311, which separates the first feed gas stream 300 into the first permeate stream 302 and the first non-permeate stream 301. Stream 301 is passed through a heater 313 and becomes the second feed gas stream 303 for the second stage membrane separation unit 312, which separates the second feed gas stream 303 into the second permeate stream 305 and the second non-permeate stream 304. The first permeate stream 302 and the second permeate stream 305 are commingled to form the total permeate gas stream 306.

Two simulation cases were done with the same feed stream and feed condition. In both cases, the $CO_2$ content was reduced from about 38% to about 12% after the first stage and from about 12% to about 3% after the second stage. For both cases, the same base module was assumed in the simulation. The only difference between these two cases is the flow configuration of membrane bundles employed in each stage membrane unit. Case 1 was simulated with cross-flow membrane bundles for both stage membrane units (XF+XF). Case 2 was simulated with cross-flow bundles for the first stage membrane unit and countercurrent flow membrane bundles for the second stage membrane unit (XF+CC). The results of the simulation cases are shown in TABLES 3-4.

installed for all first stage module to make cross-flow bundles and countercurrent flow center tube inserts can be installed for all second stage modules in order to obtain countercurrent flow bundles. Both systems process the same feed flow rate, and are designed to have the $CO_2$ content reduced from 38% to 12% after the first stage and the $CO_2$ content reduced from 12% to 4% after the second stage. However, less total membrane area (11.5% less) is required for case 2 (94700 m$^2$) compared with 107052 m$^2$ for case 1 (16.7% less). Lower total membrane area typically means lower CAPEX for the membrane system. The ability to

TABLE 3

Case 1: Cross-flow membrane bundles used in both the first and the second stage membrane units (XF + XF).

| Stream | 300 | 301 | 302 | 303 | 304 | 305 | 306 |
|---|---|---|---|---|---|---|---|
| Temperature [C.] | 50.0 | 36.9 | 43.7 | 50.0 | 44.1 | 47.1 | 44.7 |
| Pressure [bar_g] | 47.1 | 46.9 | 5.0 | 46.6 | 46.6 | 5.0 | 5.0 |
| Molar Flow [Sm3/d*] | 1644961 | 1003058 | 641903 | 1003058 | 732591 | 270467 | 912370 |
| Component (Mol %) | | | | | | | |
| CO2 | 38.01% | 11.96% | 78.72% | 11.96% | 2.99% | 36.25% | 66.13% |
| Nitrogen | 0.28% | 0.36% | 0.16% | 0.36% | 0.34% | 0.41% | 0.23% |
| Methane | 48.54% | 67.63% | 18.72% | 67.63% | 72.22% | 55.18% | 29.53% |
| Ethane | 6.41% | 9.64% | 1.37% | 9.64% | 11.50% | 4.58% | 2.32% |
| Propane | 4.11% | 6.33% | 0.65% | 6.33% | 7.83% | 2.25% | 1.12% |
| i-Butane | 0.59% | 0.91% | 0.09% | 0.91% | 1.14% | 0.30% | 0.15% |
| n-Butane | 1.41% | 2.18% | 0.20% | 2.18% | 2.72% | 0.71% | 0.36% |
| i-Pentane | 0.27% | 0.42% | 0.04% | 0.42% | 0.53% | 0.13% | 0.06% |
| n-Pentane | 0.30% | 0.47% | 0.04% | 0.47% | 0.59% | 0.14% | 0.07% |
| n-Hexane | 0.060% | 0.094% | 0.007% | 0.094% | 0.120% | 0.024% | 0.012% |
| n-Heptane | 0.010% | 0.016% | 0.001% | 0.016% | 0.020% | 0.004% | 0.002% |
| H2S | 0.010% | 0.004% | 0.019% | 0.004% | 0.001% | 0.012% | 0.017% |
| | 311 | 312 | Total | | | | |
| Membrane Area [m2] | 32939 | 74113 | 107052 | | | | |

TABLE 4

Case 2: Cross-flow bundles used in the first stage membrane unit and countercurrent bundles used in the second stage membrane unit (XF + CC).

| Stream | 300 | 301 | 302 | 303 | 304 | 305 | 306 |
|---|---|---|---|---|---|---|---|
| Temperature [C.] | 50.0 | 36.9 | 43.7 | 50.0 | 45.1 | 50.0 | 45.4 |
| Pressure [bar_g] | 47.1 | 46.9 | 5.0 | 46.6 | 46.6 | 5.0 | 5.0 |
| Molar Flow [Sm3/d*] | 1644961 | 1003058 | 641903 | 1003058 | 762525 | 240533 | 882436 |
| Component (Mol %) | | | | | | | |
| CO2 | 38.01% | 11.96% | 78.72% | 11.96% | 2.95% | 40.53% | 68.31% |
| Nitrogen | 0.28% | 0.36% | 0.16% | 0.36% | 0.35% | 0.39% | 0.22% |
| Methane | 48.54% | 67.63% | 18.72% | 67.63% | 72.71% | 51.50% | 27.65% |
| Ethane | 6.41% | 9.64% | 1.37% | 9.64% | 11.33% | 4.26% | 2.16% |
| Propane | 4.11% | 6.33% | 0.65% | 6.33% | 7.66% | 2.09% | 1.04% |
| i-Butane | 0.59% | 0.91% | 0.09% | 0.91% | 1.11% | 0.28% | 0.14% |
| n-Butane | 1.41% | 2.18% | 0.20% | 2.18% | 2.66% | 0.67% | 0.33% |
| i-Pentane | 0.27% | 0.42% | 0.04% | 0.42% | 0.52% | 0.12% | 0.06% |
| n-Pentane | 0.30% | 0.47% | 0.04% | 0.47% | 0.57% | 0.13% | 0.06% |
| n-Hexane | 0.0600% | 0.0940% | 0.0068% | 0.0940% | 0.1166% | 0.0227% | 0.0111% |
| n-Heptane | 0.0100% | 0.0157% | 0.0011% | 0.0157% | 0.0194% | 0.0038% | 0.0019% |
| H2S | 0.0100% | 0.0043% | 0.0189% | 0.0043% | 0.0015% | 0.0133% | 0.0174% |
| | 311 | 312 | Total | | | | |
| Membrane Area [m$^2$] | 32939 | 61761 | 94700 | | | | |

For both cases, the same base module can be manufactured. For Case 1, cross-flow collection tubes can be installed for all the first and the second stage bundles in order to obtain cross-flow bundles. For case 2, using the same base modules, cross-flow collection tubes can be modify the flow configuration to match with pending orders greatly improves response time and minimized inventory requirements.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A hollow fiber membrane bundle that is convertible into a hollow fiber membrane module with a cross-flow configuration or a hollow fiber membrane module with a counter-current configuration, comprising hollow fiber membranes arranged around a porous support tube, a cured resin tubesheet formed at first end of the bundle, and a cured resin nub formed at a second end of the bundle, wherein:

the bore(s) of the hollow fiber membranes are open at a face of the tubesheet adjacent the first end of the bundle;

the tubesheet adjacent the first end of the bundle has an annular structure that encapsulates the hollow fiber membranes and the support tube at the first end of the bundle but which does not completely block a first end bore of the porous support tube;

the bore(s) of the hollow fiber membranes are open at a face of the nub adjacent the second end of the bundle and the nub adjacent the second end of the bundle has a structure that encapsulates the hollow fiber membranes and the support tube at the second end of the bundle and completely blocks a second end bore of the porous support tube; and the collection tube has a plurality of orifices formed in an outer circumferential surface of the collection tube at positions adjacent to the tubesheet, positions adjacent to the nub, and positions in between the tubesheet and the nub.

* * * * *